United States Patent [19]
Froidevaux et al.

[11] Patent Number: 5,714,187
[45] Date of Patent: Feb. 3, 1998

[54] SCREW EXTRUDER AND PROCESS FOR CONTROLLING THE QUALITY OF FEEDSTUFF PRODUCTS

[75] Inventors: Pierre Alain Froidevaux, Uttwil; Willi Wetzel, Uzwil; Stefan Rutishauser, St. Gallen, all of Switzerland

[73] Assignee: Buhler AG, Uzwil, Switzerland

[21] Appl. No.: 379,479

[22] PCT Filed: May 31, 1994

[86] PCT No.: PCT/CH94/00101

§ 371 Date: Mar. 24, 1995

§ 102(e) Date: Mar. 24, 1995

[87] PCT Pub. No.: WO94/27811

PCT Pub. Date: Dec. 8, 1994

[30] Foreign Application Priority Data

Jun. 2, 1993 [CH] Switzerland .................. 01640/93

[51] Int. Cl.$^6$ .................. A23N 17/00; A23P 1/00
[52] U.S. Cl. .................. 426/231; 264/40.1; 425/144; 425/149; 426/516
[58] Field of Search .................. 426/516, 231; 425/144, 149; 264/40.1, 40.6

[56] References Cited

U.S. PATENT DOCUMENTS

| | | | |
|---|---|---|---|
| 3,255,220 | 6/1966 | Baer et al. | 241/8 |
| 4,700,310 | 10/1987 | Volk, Jr. | 364/468 |
| 4,700,622 | 10/1987 | Satake | 100/45 |
| 4,721,448 | 1/1988 | Irish et al. | 425/144 |
| 4,725,958 | 2/1988 | Volk, Jr. | 364/468 |
| 4,742,463 | 5/1988 | Volk, Jr. | 364/468 |
| 4,764,874 | 8/1988 | Volk, Jr. | 364/468 |
| 4,767,301 | 8/1988 | Volk, Jr. | 425/144 |
| 4,779,970 | 10/1988 | Irish et al. | 350/584 |
| 4,882,105 | 11/1989 | Volk, Jr. | 264/40.1 |
| 5,271,728 | 12/1993 | Froidevaux et al. | 426/516 |

FOREIGN PATENT DOCUMENTS

| | | |
|---|---|---|
| 0040406 | 11/1981 | European Pat. Off. . |
| 0095168 | 11/1983 | European Pat. Off. . |
| 0212629 | 3/1987 | European Pat. Off. . |
| 0227418 | 7/1987 | European Pat. Off. . |
| 0231764 | 8/1987 | European Pat. Off. . |
| 0371519 | 6/1990 | European Pat. Off. . |
| 0428978 | 5/1991 | European Pat. Off. . |
| 0460406 | 12/1991 | European Pat. Off. . |

OTHER PUBLICATIONS

Brochure, in the German language pertaining to the quality control system NIRVIS.

Brochure, in the German language pertaining to a pellet press KUBEX.

Brochure, in the German language pertaining to the quality control system NIRDAS.

*Primary Examiner*—George Yeung
*Attorney, Agent, or Firm*—Greenblum & Bernstein, P.L.C.

[57] ABSTRACT

A screw shaft, with associated first kneading elements rotates in a screw extruder, with further kneading elements being provided in the housing and being situated between the first kneading elements, with the further kneading elements being rotatable in the direction of rotation of the extruder and being radially displaceable in lateral and axial directions of displacement, with a back-pressure element being axially displaceable at the outlet end of the extruder screw via a known cylinder-and-piston unit thereby making it possible to alter the cross-section from the screw extruder outlet openings, with a rotating cutter cutting the product, discharged from the outlet openings, into predetermined lengths, wherein several support rings serve to support the screw in the screw extruder housing, with the rotatable further kneading elements being jointly adjustable via a driven rack, and the extruder housing being split into pivotable upper half and a fixed lower half, so that the further kneading element can be easily replaced. In addition to the screw extruder or expander structure, a process for controlling the quality of a feedstuff product is also set forth together with an installation or system for carrying out the noted process in the noted extruder.

10 Claims, 17 Drawing Sheets

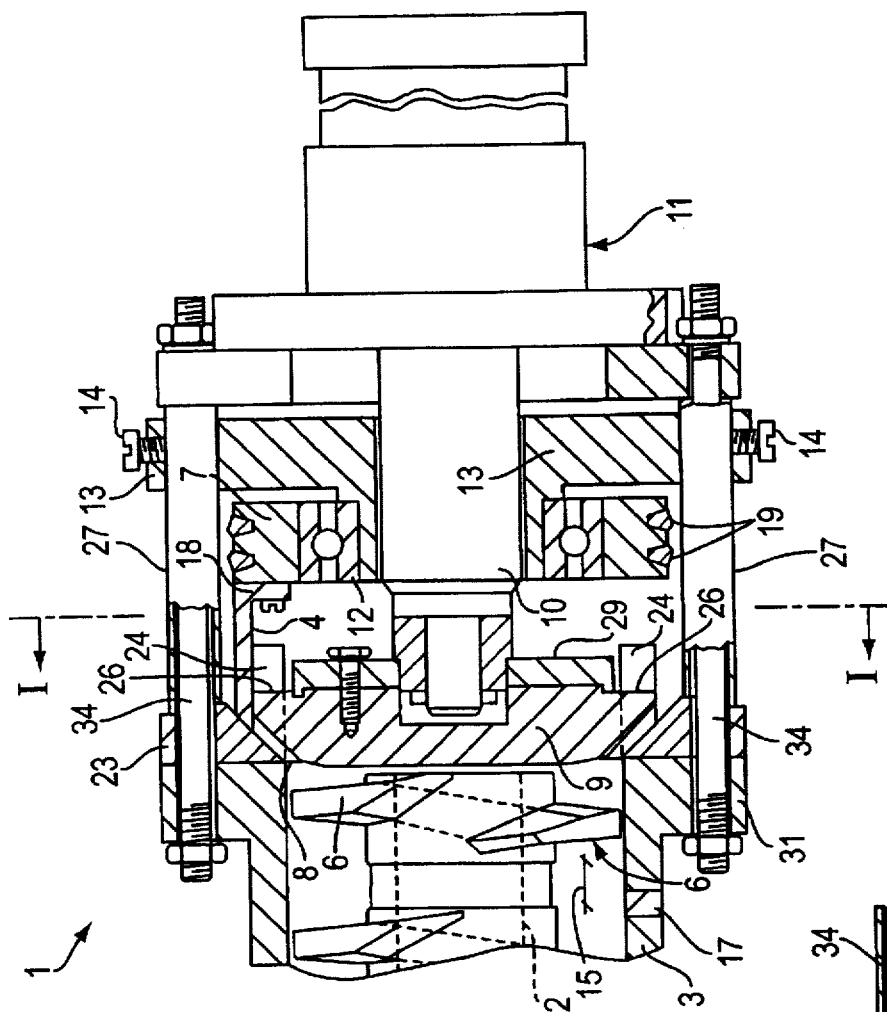
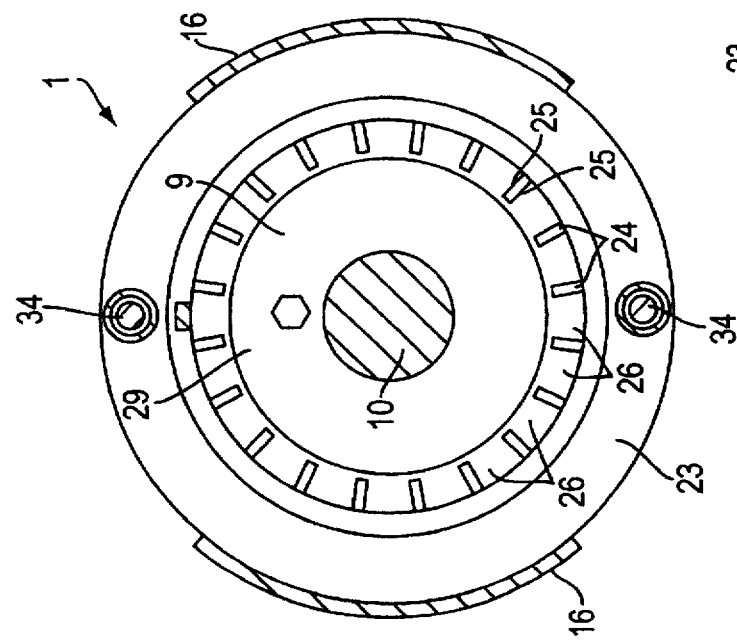
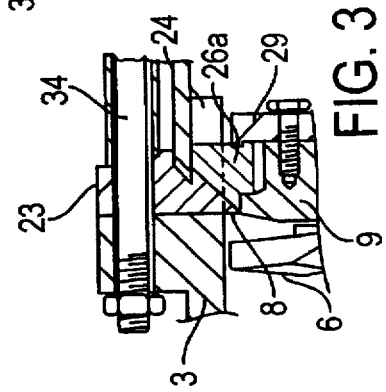
FIG. 1
FIG. 2
FIG. 3

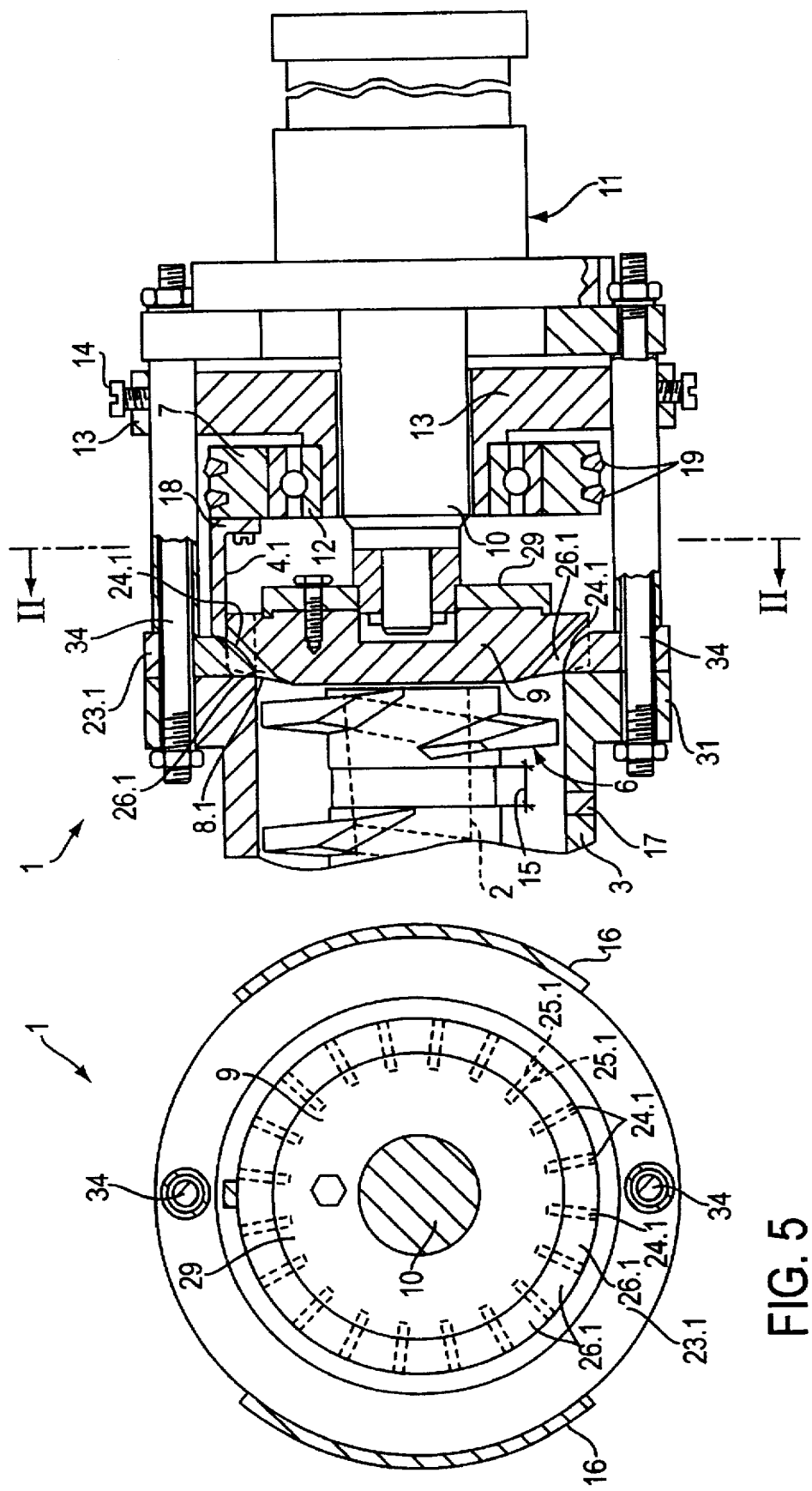

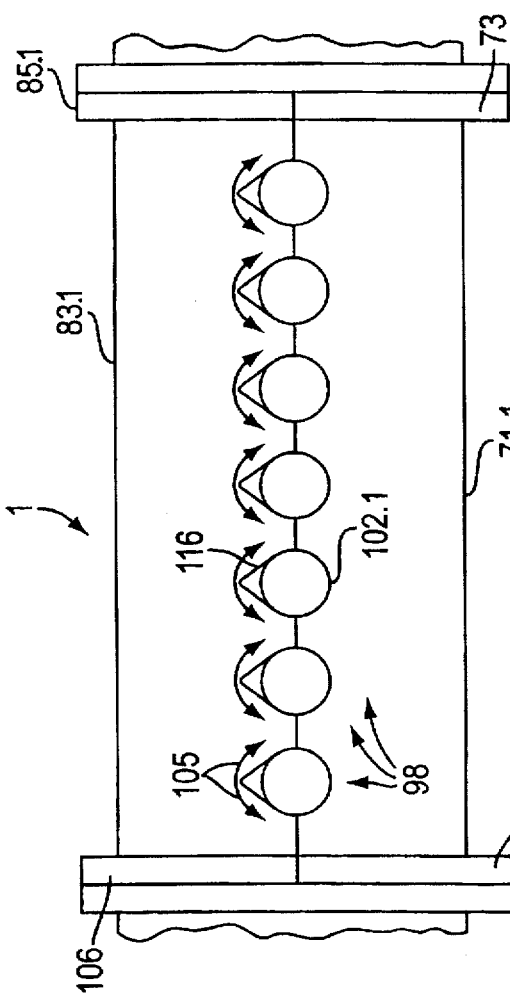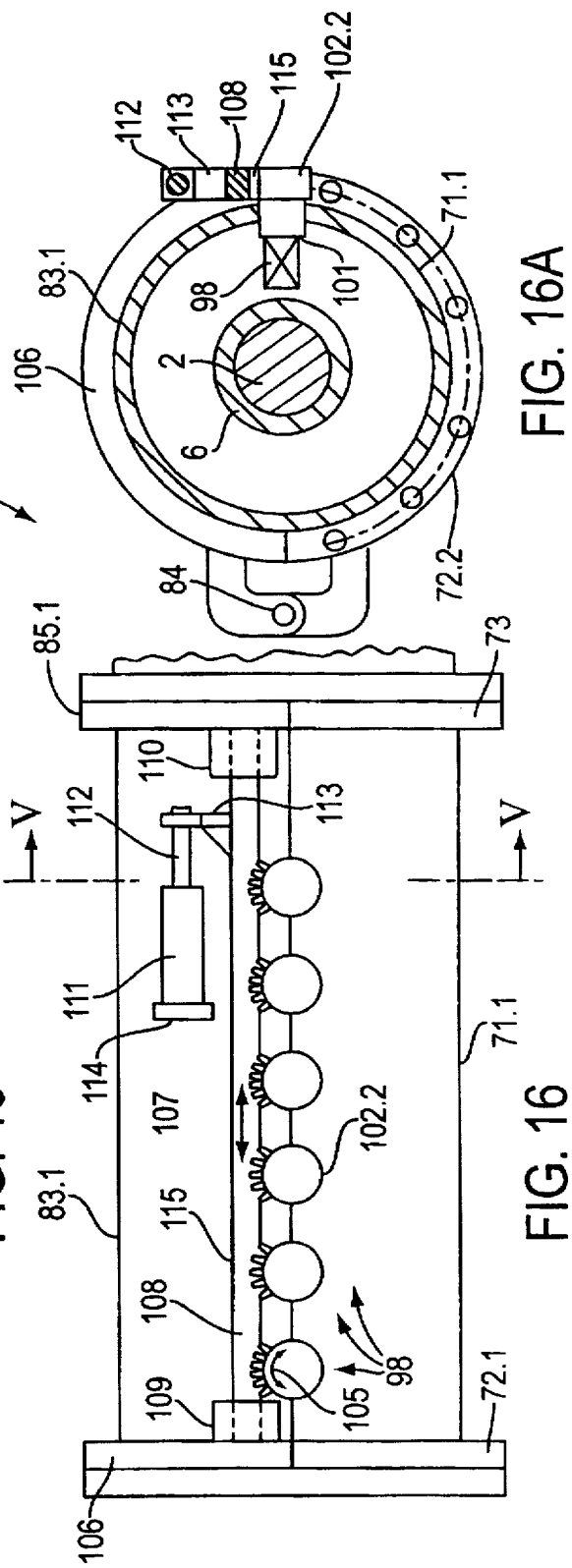
FIG. 15
FIG. 16
FIG. 16A

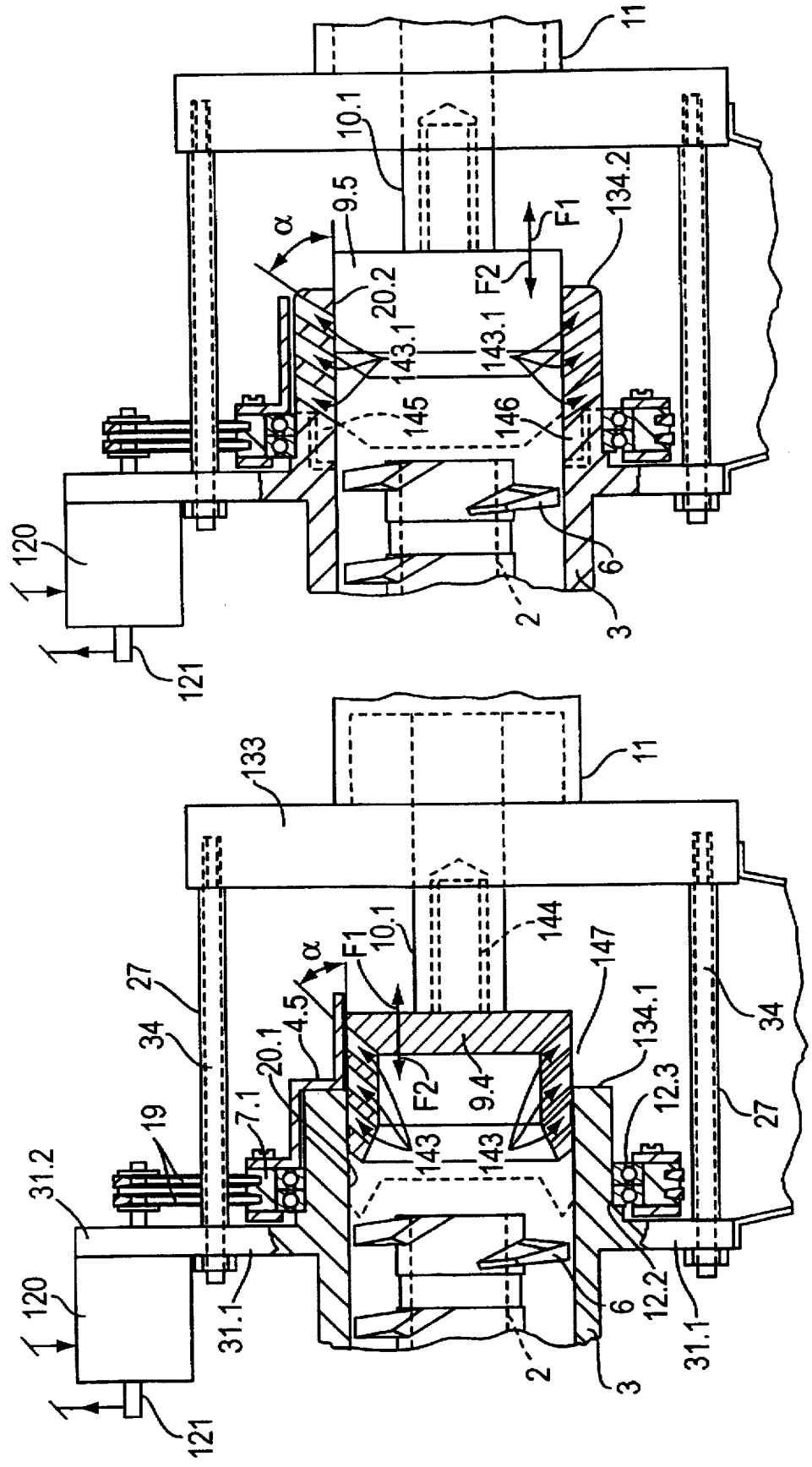

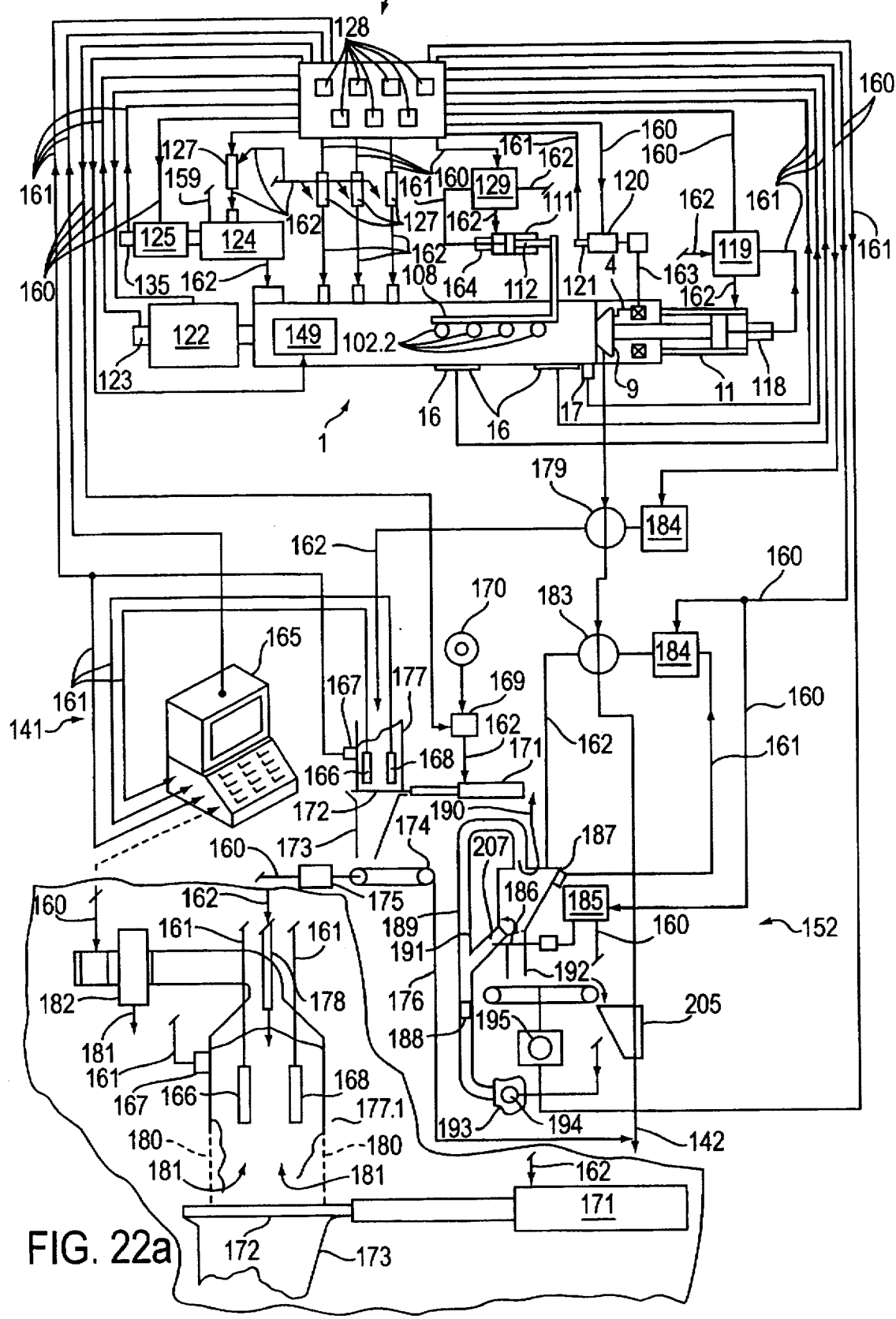

SCREW EXTRUDER AND PROCESS FOR CONTROLLING THE QUALITY OF FEEDSTUFF PRODUCTS

BACKGROUND OF THE INVENTION

1. Field of the Invention

This invention relates to a process for controlling the quality of a feedstuff product which is kneaded and formed under pressure.

2. Discussion of the Background of the Invention and Material Information

A device of this type is known from the European Patent Application with the Publication Number 0 428 978 A1 which is also assigned to the assignee of this invention.

Measures are primarily described therein in order firstly to obtain moldings or formed feedstuff products which are better than those obtained in the prior art referred to therein, and secondly to fashion parts subject to wear so that these pans subject to wear can be replaced efficiently and economically.

The underlying object of this invention is to fashion a device of this type so that means are provided in order to match the state and/or the properties of the product to predetermined values.

SUMMARY OF THE INVENTION

Means are proposed according to the invention in order to achieve this object. In principle, the aforementioned EP 0 428 978 A1 forms an integral component of this invention.

Specifically, this invention pertains to a process for controlling the quality of a feedstuff product which is kneaded and formed under pressure in at least one device for producing the feedstuff product, the process comprising: measuring at least one of the following properties of the final feedstuff product, and, depending on the degree of the deviations of the feedstuff product outside a predetermined set value range and; altering the adjustment parameters on the at least one device producing the feedstuff product until the properties fall within the set value range, wherein the properties include:

the moisture content of the product;

the degree of gelatinization of starch;

the protein content;

the fat content; and the abrasion resistance of the feedstuff product.

The process of this invention includes measuring the properties in a laboratory; and measuring the properties both on-line and automatically after the entering of the feedstuff product from the at least one device for producing the feedstuff product.

The process of this invention also includes altering of the adjustment parameters by manual alterations, based upon the indication of the adjustment parameters, by the "trial and error" principle; and automatically altering of the adjustment parameters, based on an empirically determined and statistically evaluated recipe. Preferably, the process also includes measuring the abrasion resistance by means of an abrasion apparatus.

In another embodiment of the process of this invention, the at least one device includes a screw extruder or an expander, and wherein the adjustment parameters comprise at least one of the following possible adjustments:

adjustment of the amount (kg/h) of feedstuff input product;

speed of the screw shaft of the one of the screw extruder and expander;

the amount of water and/or steam fed at a predetermined temperature into the one of the screw extruder and expander and/or into a feeder device for the feedstuff input product;

adjustment of externally adjustable kneading elements in the one of the screw extruder and expander;

adjustment of a quantity of heat, which is independent of the friction of the feedstuff product, in order to heat the feedstuff product situated in one of the screw extruder and expander;

adjustment of the feedstuff product cross-section; and adjustment of the feedstuff product length. Preferably, the at least one device includes a pellet press, with an additional adjustment parameter on the pellet press being the distance between rolls and a mold thereof.

A further embodiment of the process of this invention includes electro-optically measuring at least one of the following properties by means of wavelengths which lie in the proximity of the infrared region, the properties including:

moisture content of the feedstuff product;

fat content of the feedstuff product;

degree of gelatinization of starch in the feedstuff product; and protein content of the feedstuff product. Preferably this embodiment also includes making the measuring on one of diverted portions and continuously on-line, as well as cooling the product to be measured.

This invention also pertains to a screw extruder or expander for carrying out a process of this invention wherein the screw extruder or expander includes a kneading and compaction screw disposed in a housing so the it can be rotatably driven; and an extrusion head attached to the housing, wherein the feedstuff product can be extruded into a predetermined shape, with the extrusion head including: a back-pressure element; and an annular body, with the annular body adjoining the housing and at least partially surrounding the back-pressure element when viewed in the axial direction; wherein one of the back-pressure element and/or the annular body comprise forming channels of a predetermined shape for forming the cross-section of the feedstuff product, and including means for altering the longitudinal shape of the feedstuff; and further means for matching the state and/or the properties of the feedstuff product to predetermined feedstuff product values.

In another embodiment of the screw extruder or expander of this invention, the properties of the feedstuff product include at least one of the following:

the density of the feedstuff product;

the homogeneity of the feedstuff product;

the temperature of the feedstuff product; and the degree of gelatinization of the feedstuff product.

In a further embodiment of the screw extruder or expander of this invention, the further means for matching influences the kneading effect on the feedstuff product in the screw extruder or expander. Preferably, the means for altering additionally includes insertion bodies fixedly disposed on the annular body, with the insertion bodies extending into forming channels of the back-pressure element and thereby together with the forming channels form the cross-section of the feedstuff product, and wherein the back-pressure element is axially adjustable in order to alter the cross-section of the feedstuff product.

In an additional embodiment of the screw extruder or expander of this invention, the means for altering includes additional insertion bodies which engage in the forming channels of the back-pressure element and thereby together with the forming channels form the cross-section of the feedstuff product, and that in order to alter this cross-section, the insertion bodies are resiliently disposed in the annular body in such a way that the insertion bodies can be moved radially inwardly via additional means and can be independently moved outwardly again due to their inherent resilience. Preferably, the additional means for radially moving the insertion bodies firstly comprises ramps on the insertion body and secondly comprises a ring which can be moved in the axial direction of the kneading and compaction screw via these ramps, with the ring being so shaped that axial movements of the ring move the insertion bodies radially inwardly. Preferably the movable ring is displaceable by a motor.

In yet another embodiment of the screw extruder or expander of this invention, means for pressure reduction are provided at outlets of the forming channels in order to place the forming channels under reduced pressure.

In yet a further embodiment of the screw extruder or expander of this invention, the means for altering the longitudinal shape of the feedstuff product comprise a cutter moving past outlet ends of the forming channels, and means for driving are provided in order to drive the cutter independently of the speed of the extruder screw. Preferably, at least one of the means and further means are replaceable kneading elements disposed in the housing with the kneading elements engaging in gaps in the screw spirals. Preferably, the kneading elements are one of fixedly and/or adjustably disposed, and have an asymmetric cross-section when viewed in the radial direction of the one of screw extruder and expander. The extruder housing is preferably pivotally mounted to swing open in order to permit replacement of the kneading elements, and the kneading elements are rotatably driven.

In yet a differing embodiment of the screw extruder or expander of this invention, the screw extruder includes at least one support ring, with the support ring providing additional rotational support for the shaft of the screw, at least at an end of the screw shaft being directed towards an extrusion die.

Another embodiment of this invention pertains to an installation for carrying out a process of this invention while utilizing the screw extruder or expander of this invention wherein the installation includes: an adjustment and control installation, with the installation controlling at least one of the following functions via one of the screw extruder and expander, namely; speed of the screw; rotational speed of a metering unit for controlling the amount of an input feedstuff fed into one of the screw extruder and expander; the amount Of water and/or steam fed into the metering unit and/or into the one of the screw extruder and expander at a predetermined temperature; control of the pressure in a displacement cylinder for adjusting the kneading elements; control of the temperature of a heating element for controlling the temperature of the feedstuff product in the one of the screw extruder and expander; control of the pressure in a piston-and-cylinder unit for displacing the back-pressure element in order to maintain a predetermined pressure within the one of the screw extruder and expander; control of the travel of a piston of the piston-and-cylinder unit in order to maintain the position of the back-pressure element; and control of the peripheral speed of a cutter in order to produce a predetermined length of the feedstuff product. Preferably, the functions, controlled via the one of the screw extruder and expander are indicated on the adjustment and control installation.

A further embodiment of the installation of this invention further includes the addition of a by-passable pellet press, wherein the distance between rolls and a mold is adjustable, and wherein the power being consumed by the installation is also measured. Preferably, the installation includes the addition of a by-passable measuring device, for the measurement of one of portions and the continuous on-line measurement of at least one of the following properties of the feedstuff product:

moisture content;

degree of gelatinization;

fat content;

protein content; and abrasion resistance.

Another embodiment of the installation of this invention includes the addition of a by-passable measuring device, for the measurement of one of portions and the continuous on-line measurement of at least one of the following properties of the feedstuff product:

moisture content;

degree of gelatinization;

fat content;

protein content; and abrasion resistance.

In a differing embodiment of the installation of this invention, the on-line measurement of at least one of the following properties:

moisture content;

degree of gelatinization;

fat content; and protein content is provided one of after the screw extruder; or after the pellet press; or after the screw extruder and after the dicing press.

In a further embodiment of the installation of this invention, the on-line measurement of the abrasion resistance is provided one of after the screw extruder; after the pellet press; and after the screw extruder and after the dicing press. Preferably, the on-line measurement of one of the following properties:

moisture content;

degree of gelatinization;

fat content; and protein content is provided before or after the on-line measurement of the abrasion resistance.

In yet another embodiment of the installation of this invention, all of the measuring operations can be by-passed.

In a final embodiment of the installation of this invention, the adjustment and control installation includes a computer, the computer firstly storing the recipes and causing the recipes to be implemented based on a set value range for the feedstuff product quality and the computer secondly altering the recipes when deviations from the set value are determined based on the on-line measurements.

The advantage of the invention is that the desired product can be obtained in an improved and more efficient manner in relation to its properties and shape as desired by feedstuff customers.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters, or reference characters with suffixes, to denote the same or analogous components and wherein:

FIG. 1 is a partial sectional view of the head part, in accordance with the invention, of a screw extruder for the formation of formed bodies;

FIG. 2 is a cross-sectional view of the head part of FIG. 1 taken along line I—I of FIG. 1;

FIG. 3 is a partial sectional view breakout of variation of a detail of FIG. 1;

FIG. 4 is a partial sectional view of a variation of the head part of FIG. 1;

FIG. 5 is a cross-sectional view of the head part of FIG. 4 taken along line II—II of FIG. 4;

FIG. 14a is a cross section of the adjustable kneading elements of FIG. 14 taken along line VI—VI of FIG. 14;

FIG. 15 is partial plan view of one type of application of the screw shaft part of FIG. 14;

FIG. 16 is a partial plan view of another type of application of the screw shaft part of FIG. 14;

FIG. 16a is a cross-sectional view of the screw shaft part of FIG. 16 taken along line V—V of FIG. 16;

FIG. 20 is a partial sectional view of a further variation of the head part of FIG. 9;

FIG. 21 is a partial sectional view of still a further variation of the head part of FIG. 9;

FIG. 22 is a variation of the schematic diagram of FIG. 17;

FIG. 22a is an enlarged part of a portion of FIG. 22;

DETAILED DESCRIPTION OF THE PREFERRED EMBODIMENTS AND BEST MODE

Figure 7:
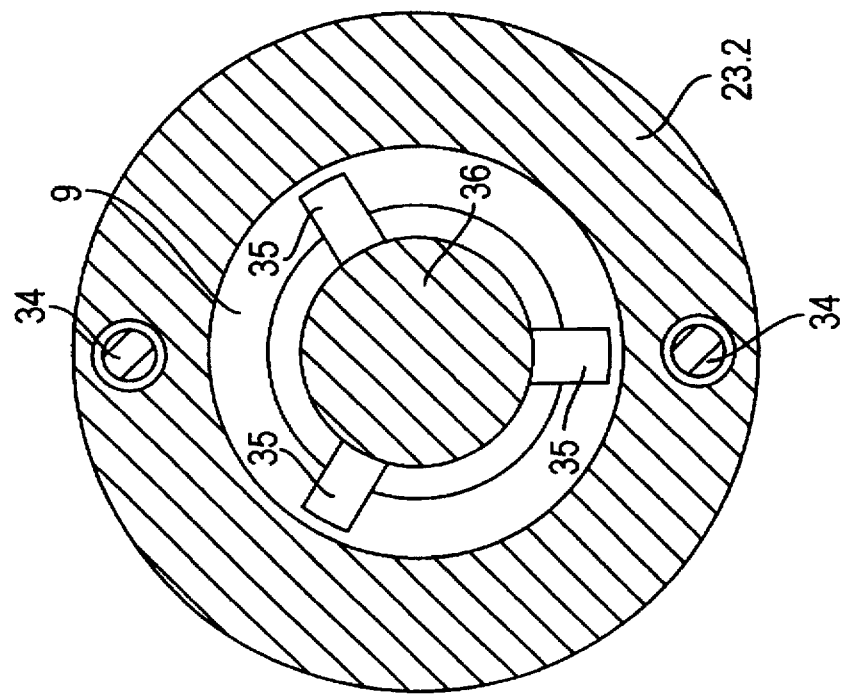
FIG. 7 is a cross-sectional view of the head part of FIG. 6 taken along line III—III of FIG. 6.

FIGS. 1 and 2 illustrate a screw extruder 1, essentially the head part thereof, in which the product is formed and is expelled from the head as a formed body, for example downwards as shown in FIG. 1.

A screw extruder such as this can also be used as an expander, in which an overpressure is generated in the product during the kneading and conveying of the latter. The product expands in the atmosphere, i.e. when it emerges from the extrusion head, and has the corresponding properties of such a formed body.

In principle, however, this is a device in which a product is kneaded and conveyed and is charged in a predetermined manner with steam and/or water in order thereby to produce a formed body from a farinaceous product. Measures are described in the following description which firstly relate to forming the product to form the said formed bodies and which secondly comprise measures for influencing the kneading effect in the region before the head part so as to obtain, in combination with the forming of the formed bodies in the extrusion head, a product which helps to meet the demands of the purchaser of these formed bodies or of the users of these formed bodies, with optimum utilisation of the feedstuff.

The screw extruder comprises a-screw shaft 2 with kneading tools 6, which is mounted in a housing 3 so that it can rotate and can be driven.

The heading tools are elements between which a free space 15 is provided, in which additional fixed kneading tools can be inserted, as described later.

Temperature sensors 16 and at least one pressure sensor 17 are firstly provided on the housing 3. The signals from these two sensors are employed in combination with other features in order to influence the final product, as described later.

The housing 3 has a housing flange 31 to which an insertion tooth ring 23 is attached, which ring has insertion teeth 24 which engage in slots with slot walls 25 in order thereby to form passageway openings 8.

The elements between the slob delimited by the slot walls 25 are denoted and characterised as teeth 26.

The slots and teeth 26 are parts at the periphery of a back-pressure element 9, which is seated fixed on a piston rod 10 which is part of a cylinder-and-piston unit 11 and is thereby displaceable.

The back-pressure element 9 is secured against rotation by the insertion teeth 24, in that the latter are firstly parts of the fixed insertion tooth ring and secondly engage in the slots delimited by the slot walls 25.

The back-pressure element 9 is rigidly attached to a retaining plate 29, which in turn is rigidly attached to the piston rod 10.

A cutter 4 which is moved past the outlet mouths of the passageway openings 8 is fastened by means of a cutter base 18 to a support ring 7 which is seated on a support body 13 by means of rolling bearings 12 so that it can be rotated and driven. The support body is mounted on connecting stays 27 and can be fixed thereon by means of locking screws 14.

The ability to displace and fix the support body 13 enables the cutter 4 to be positioned accurately, in order thereby to obtain a clean cut of the formed bodies. The support ring 7 is driven via V-belts 19 by a drive (not shown) which has a controlled variable speed.

In this connection FIG. 3 shows a variant of the head of FIGS. 1 and 2, wherein the teeth 26a are replaceable. In this variant the teeth 26a are fixed in position by the retaining plate 29.

FIG. 4 shows a variant 8.1 of the passageway opening compared with that of FIG. 3, in which it is tapered compared with the passageway opening 8 of FIG. 1, which has a cross-section which is constant from the inlet mouth to the outlet mouth. The teeth 24.1 of the insertion tooth ring 23.1 are accordingly provided with a convexity, and the insertion teeth 24.1 engage in the slots with slot walls 25.1 in order thereby to seal the passageway opening in this region so that the cross-section of the product at the outlet mouth of the passageway opening 8.1 corresponds to the cross-section of the outlet mouth.

The cutter 4.1 is shaped correspondingly, but is supported and moved as described for FIG. 1.

The other elements correspond to the elements of FIGS. 1 or 2, and are accordingly denoted by the same reference numerals and will not therefore be described further.

FIG. 5 is a cross-section through FIG. 4 along section line II of FIG. 4.

Figure 6:
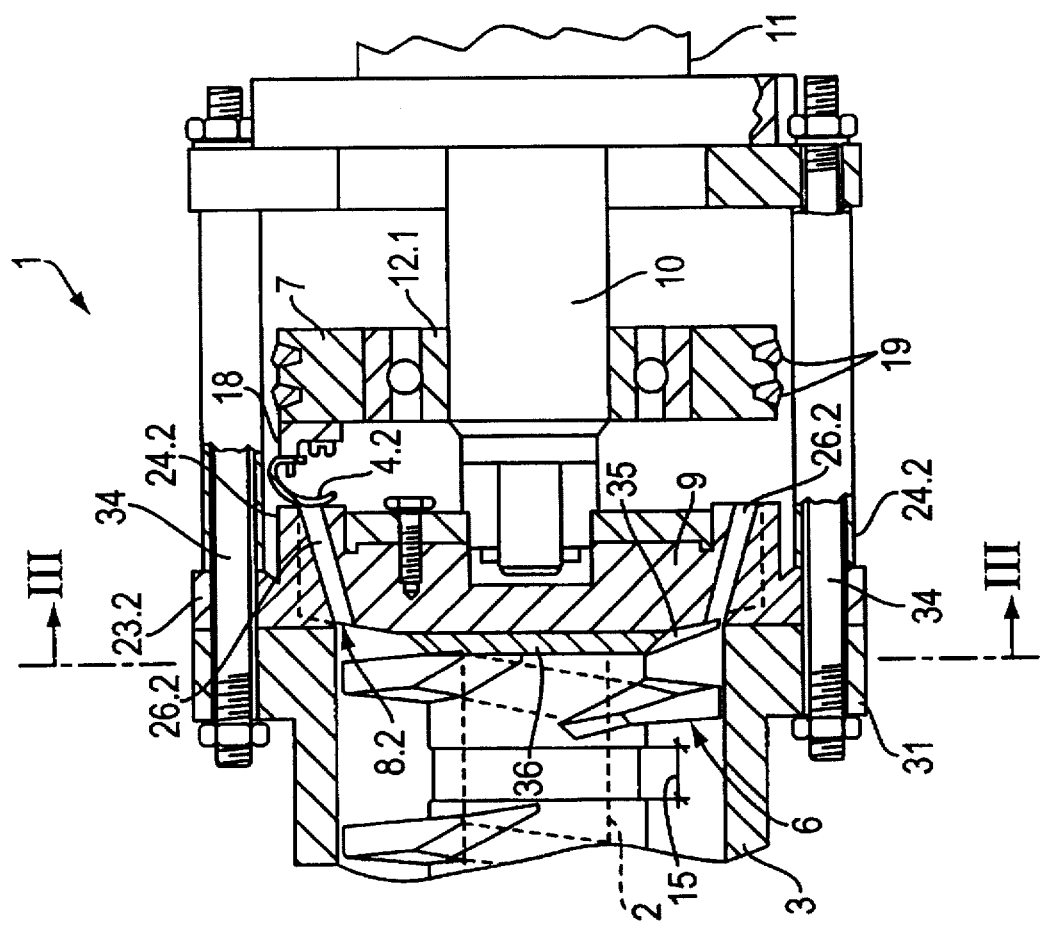
FIG. 6 is a partial sectional view of a further variation of the head part of FIG. 1.

In this connection, FIG. 6 shows a variant compared with FIGS. 1 and 4, wherein an impact pressure tooth body 36, with which three impact pressure teeth 35 are associated, is provided between the end of the screw shaft 2 and the back-pressure element. In principle, more or fewer than three impact pressure teeth may be provided. This depends on the type of product, since these impact pressure teeth are moved past in front of the inlet mouth of the passageway opening 8.2 and thereby close this mouth for this instant, so that the product which is subsequently conveyed is compacted to a greater extent than beforehand or afterwards.

The impact pressure tooth carrier 36 is rigidly attached to the end of the screw shaft 2 and accordingly rotates synchronously with the latter.

Moreover, the insertion tooth ring 23.2 and the insertion teeth 24.2, as well as the teeth 26.2, correspond in principle to the teeth 26.1 shown in FIG. 4, but not to the convexity of the teeth 24.1 shown in FIG. 4. They correspond instead to a slight tapering of the passageway opening 8.2. A constant cross-section may be provided instead of a taper such as this, however.

In place of the cutter 4.1 of FIG. 4, a cutter 4.2 is provided here which is attached in the form of a spring to the cutter base 18 and which rotates by means of the support ring 7, as described above.

In contrast to the rolling bearing 12 of FIGS. 1 and 4, the rolling bearing 12.1 is freed directly to the piston rod 10 and accordingly moves together with the back-pressure element 9.

The other elements correspond to those which have already been described above, and accordingly will not be described further.

FIG. 7 is a cross-section through FIG. 6 along section line III of FIG. 6.

Figure 8:
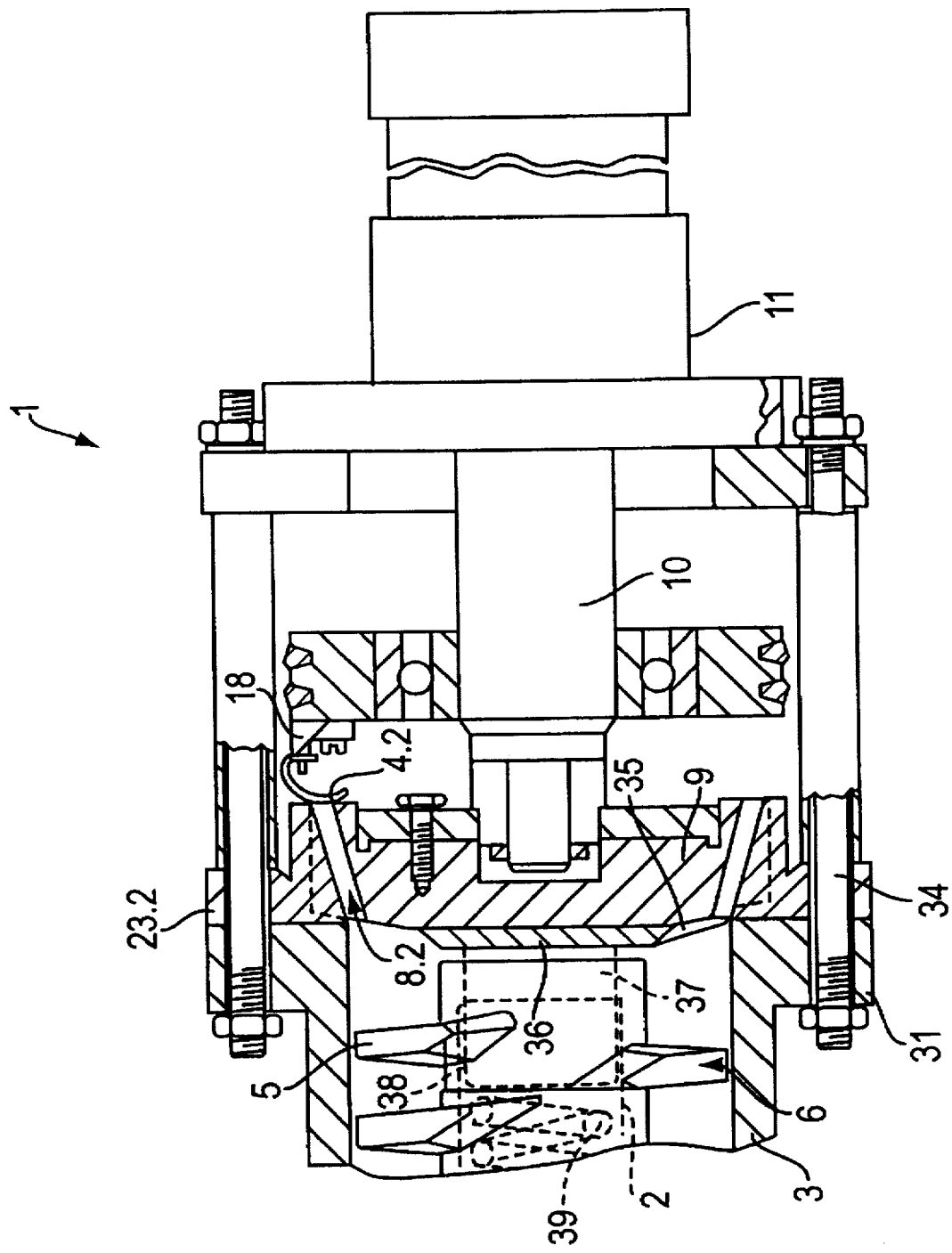
FIG. 8 is a partial sectional view of a variation of the head part of FIG. 6.

In this connection, FIG. 8 shows a variant compared with FIG. 6, wherein the impact pressure tooth carrier 36 is not rigidly attached to the end of the screw shaft 2 but is attached to a shaft 37 which is displaceably provided in the screw shaft 2. A driver part 38 forms the connection between the shaft 37 and the screw shaft 2 in the circumferential direction, i.e. causes the impact pressure tooth carrier 36 to rotate synchronously with the screw shaft 2. In contrast, the driver key 38 or a corresponding slot in the shaft 37 allows the impact pressure tooth carrier 36 to be axially displaceable in the screw shaft 2. In order to ensure that the impact pressure tooth carrier 36 or the impact pressure teeth 35 moves conjointly, even when the back-pressure element 9 moves due to a desired increase in the cross-section of the passageway opening 8.2, a pressure spring 39 is provided in the screw shaft 2 which provides for the impact pressure tooth carrier 36 to be seated against the back-pressure element 9 under a predetermined pressure.

The other elements correspond to those described previously and will not be described again.

Figure 9:
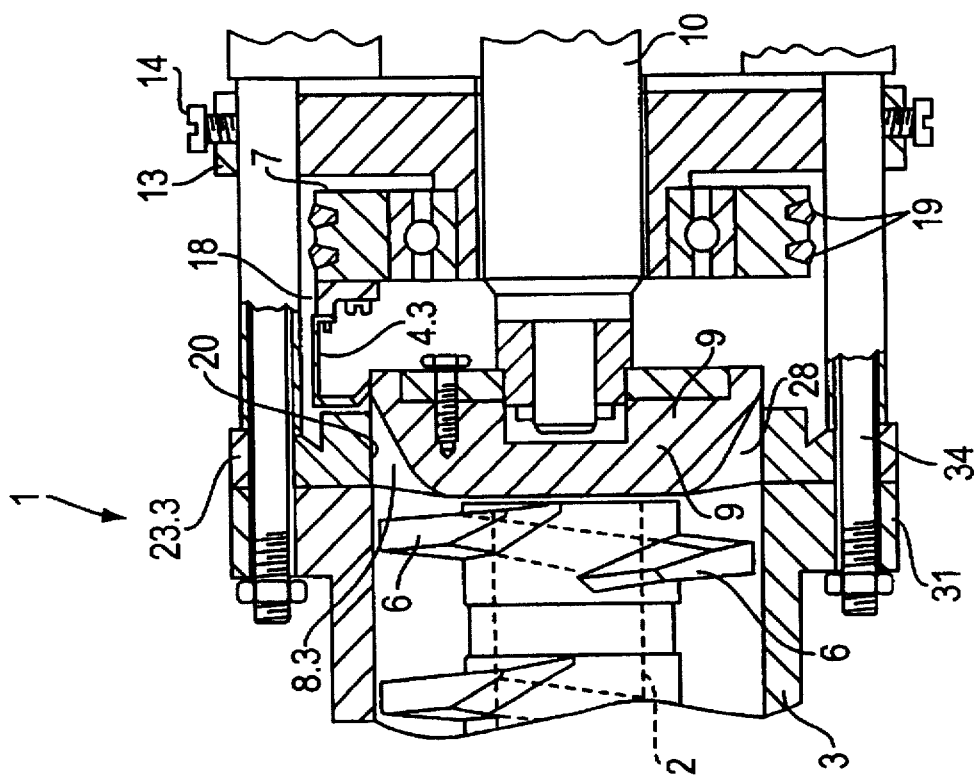
FIG. 9 is a partial sectional view of yet a further variation of the head part of FIG. 1.

FIG. 9 shows a further variant of the passageway opening 8, which is accordingly denoted by 8.3. It can be seen from this Figure that the passageway opening is formed radially, firstly by an area 28 of a slot milled in the back-pressure element 9 and secondly by a cylindrical inner face 20 of the insertion tooth ring 23.3. The width of the slot as viewed in the peripheral direction of the back-pressure element 9 thus substantially corresponds to that of the slots described previously.

The advantage of this variant is the simpler type of construction of the form of the passageway opening 8.3 compared with the previous variants.

A cutter 4.3, which is fastened to the base 18, rotates by means of the support ring 7, as described previously for FIGS. 1 and 4.

The other elements have already been described and will therefore not be mentioned further.

Figure 10:
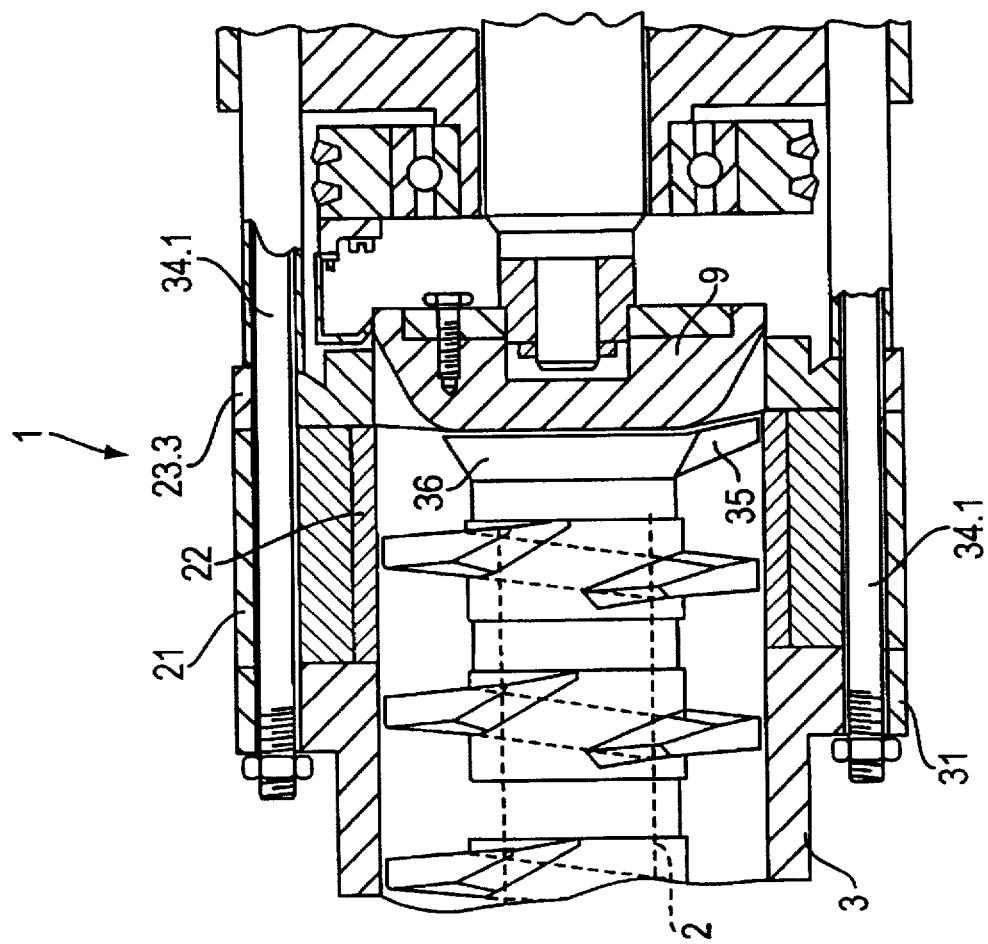
FIG. 10 is a partial sectional view of a variation of the head part of FIG. 9.

In this connection, FIG. 10 shows a variant compared with FIG. 9 wherein an insertion ring 21 having a support and bearing ring 22 is provided between the housing flange 31 and the insertion tooth ring 23.3. The support and bearing ring serves as a support and bearing ring for the heading tools 6 and thereby serves as an element which can be rapidly replaced and the dimensions and material of which can be adapted in an optimum manner.

As shown in a subsequent Figure, these insertion rings 21 and support and bearing rings 22 can be provided at predetermined or selected points along the entire length of the screw in order thereby to mount the screw so that it can rotate.

The other elements correspond to those of FIG. 9 and will not be described further.

Figures 11, 11A:
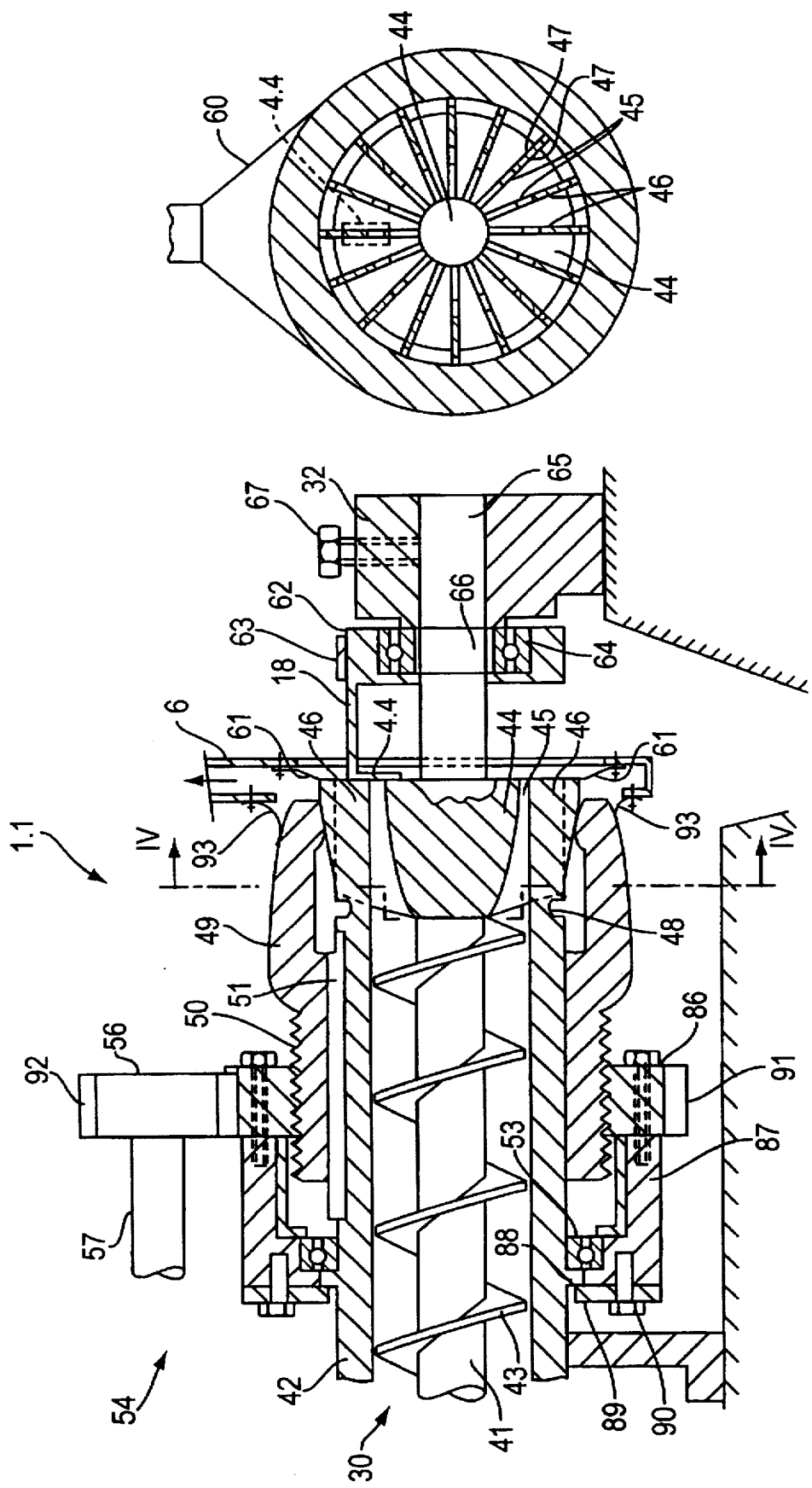
FIG. 11 is a semi-schematic longitudinal section of a further head part, in accordance with the invention, of a screw extruder.
FIG. 11a is a cross-sectional view of the head part of FIG. 11 taken along line IV—IV of FIG. 11.

FIGS. 11 and 11a show a screw extruder 1.1 having an extrusion screw 30 which consists of a screw shaft 41 and a screw spiral 43 and which is mounted in a housing 42 so that it can rotate and can be driven. An extrusion die 44 is provided at the right-hand end of the extrusion screw 30 as shown in FIG. 11. The extrusion die does not contact the extrusion screw but directly adjoins it, and is disposed fixed in a carrier 32 by means of a cylindrical extrusion die pillar 65. A locking screw 67 is provided for fixing the extrusion die pillar 65. A rolling bearing 64 is attached to a bearing cylinder 66, which has a diameter which is larger, by 2 mm for example, than that of the extrusion die pillar 65. The rolling bearing serves to receive a support disc 62 to which the cutter base 18 of a cutter 4.4 is rigidly attached.

The support disc 62 is set in rotation by a drive (not illustrated) by means of a drive belt 63. Forming channels 45 are provided in the extrusion die 44. Insertion pieces 46 engage in these forming channels so as to delimit the forming channels 45 radially outwardly as seen from the extrusion die 44.

The insertion pieces 46 are resiliently attached to the housing 42 by means of a slot 48 in such a way that the cross-section of the forming channels 45 can be altered by means of a radial movement of the insertion pieces 46.

The forming channels 46 are delimited peripherally by the forming walls 47.

Due to the rotation of the cutter 4.4, shaped product bodies which emerge at a predetermined speed at the outlet mouth of the forming channels 45 are cut to a predetermined length based on a predetermined cutter speed.

In order to move the insertion pieces 46 radially inwards, a ring 49 is provided which is displaceable on the housing 42 in the axial direction of the conveyor screw by means of a sliding guide. The ring 49 is displaced by means of a thread 50 forming part of the ring 49 and by an opposing threaded ring 86 which is matched thereto and which is axially fixed, by means of the rotation of the ring 86.

To prevent the ring 49 from rotating, the latter is guided by means of a guide keyway 51 fitted into the housing 42.

The threaded ring 86 is a component of a thread drive 54, which comprises a threaded ring carrier 87 to which the threaded ring 86 is attached and which is rotatably disposed on a rolling bearing 53, which itself is provided as a fixed component on the housing 42.

So that the threaded ring carrier 87 and thus the threaded ring 86 are axially fixed, the housing 42 has a guide ring 88 against which the rolling bearing 53 is seated on one side and against which the stop ring 89, which is attached to the threaded ring carrier 87 by means of a screw 90, is seated on the other side.

The threaded ring 86 is driven by means of a drive pinion 56 which is provided with teeth 92 matched to the teeth 91 of the threaded ring 86.

The drive pinion 56 is set in motion by a drive (not illustrated) via a drive shaft 57.

A minimal clearance is provided between the forming walls 47 of the forming channels 45 and the insertion pieces engaging therebetween. This clearance essentially prevents the emergence of product, but permits the passage of air.

In order to selectively to extract this entering air by means of reduced pressure, an extraction device 60 is disposed at the right-hand end of the ring 49 as seen in FIG. 11.

Seals 61 and 93 ensure that substantially no leakage air is drawn in by suction through the extraction device 60.

With the aid of this extraction device 60 it is possible to control the expansion effect of the product after it leaves the forming channel 45.

Figure 12:
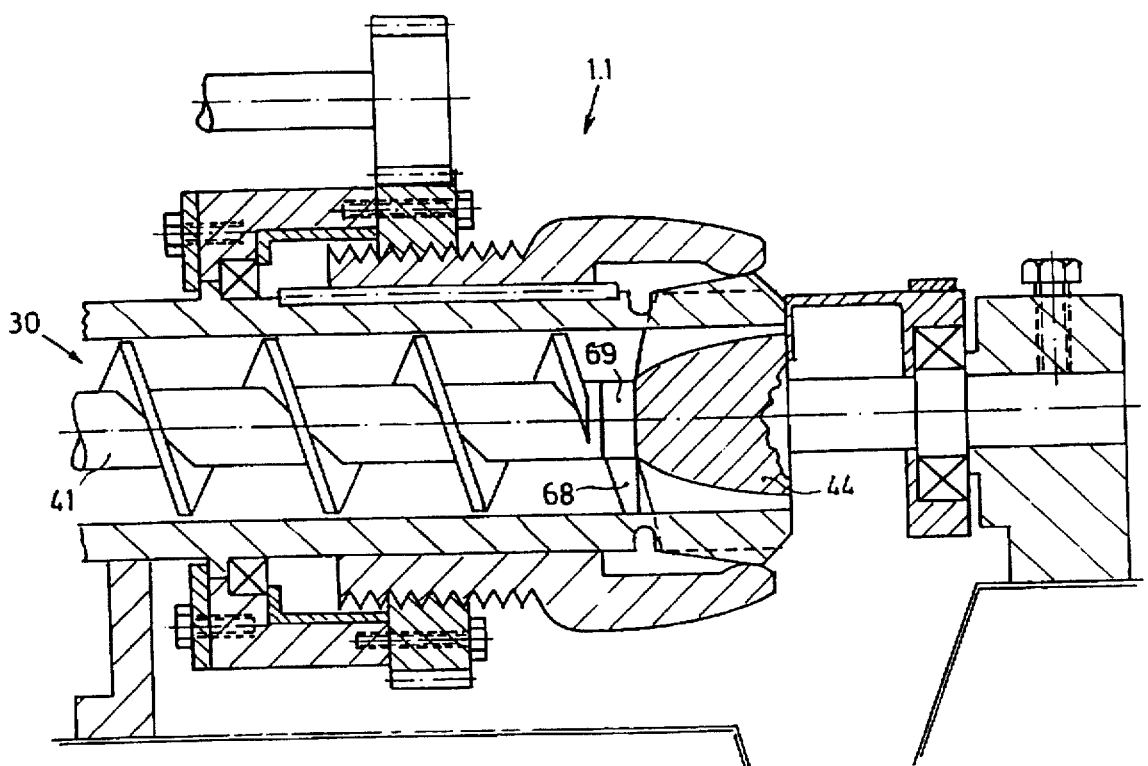
FIG. 12 is a partial sectional view of a variation of the head part of FIG. 11.

In this connection, FIG. 12 shows a variant of FIG. 11 and 11a, wherein an impact pressure tooth carrier 69 on which impact teeth are disposed is provided between the extrusion screw 30 and the extrusion die 44. These impact pressure teeth perform the same function as that already described earlier for FIGS. 6 and 7 and 8 and 10.

The other elements of FIG. 12 correspond to the elements of FIGS. 11 and 11a, and these will therefore not be described further and not characterised further.

Figure 13:
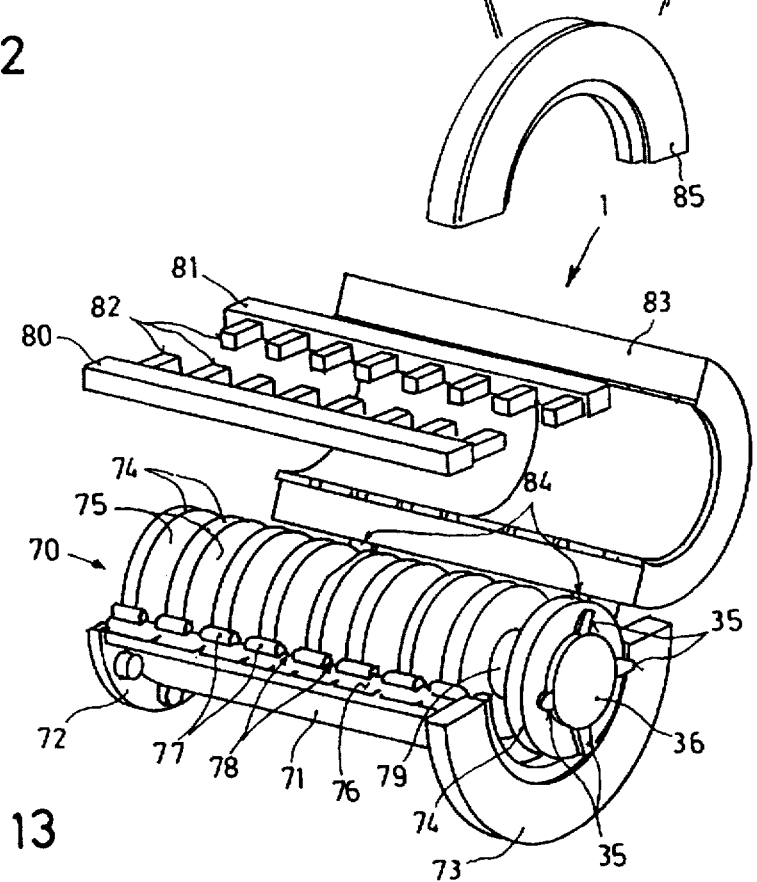
FIG. 13 is an exploded view of a variation, in accordance with the invention, of at least one part of a screw extruder that is located in front of the head part of the screw extruder.

FIG. 13 shows an extrusion screw 70 with kneading tools 74 which correspond to the kneading tools of the Figures described previously, and which have intermediate spaces 75 disposed therebetween. Fixed kneading elements 82 engage in these intermediate spaces 75, and are rigidly attached to a rod 80 and 81, respectively. The rods can be removed from the screw housing as shown in FIG. 13.

For this purpose the screw housing consists of a lower housing half 71 as seen in FIG. 13 and an upper housing half 83; these halves are pivotally attached via hinges 84.

When the rod 80 is disposed in the housing, it rests on a support surface 76 and the kneading elements thereby engage in intermediate spaces 78 which are provided between support elements 77.

The rod 81 is disposed in an analogous manner to the rod 80 on a support surface which is not visible here, the kneading elements 82 of the rod 81 engaging in the same way in intermediate spaces, which are not shown, in order to project into the intermediate spaces in an analogous manner.

The kneading elements 82 may have different shapes and lengths, so that different kneading effects can be obtained by replacing the kneading elements 82.

The kneading elements 74 of the extrusion screw are disposed on a screw shaft 79 in the manner described previously. An impact pressure tooth carrier 36 having impact pressure teeth 35 is provided at the right-hand end of the screw shaft 79 as seen in the Figure.

It can be seen from this variant that the impact pressure teeth do not have to be provided as an arrangement of three as shown in FIG. 7, but may also be provided in any other arrangement, which must be symmetrical however.

In a manner similar to that in which the upper half 83 of the housing can be swung out, a front upper flange half 85 can be lifted off from a front lower flange half 73.

The matching upper flange half of the rear housing flange 72 is not illustrated here.

The expressions "lower", "upper", "rear" and "front" relate to the direction of view of this Figure.

Figure 14:
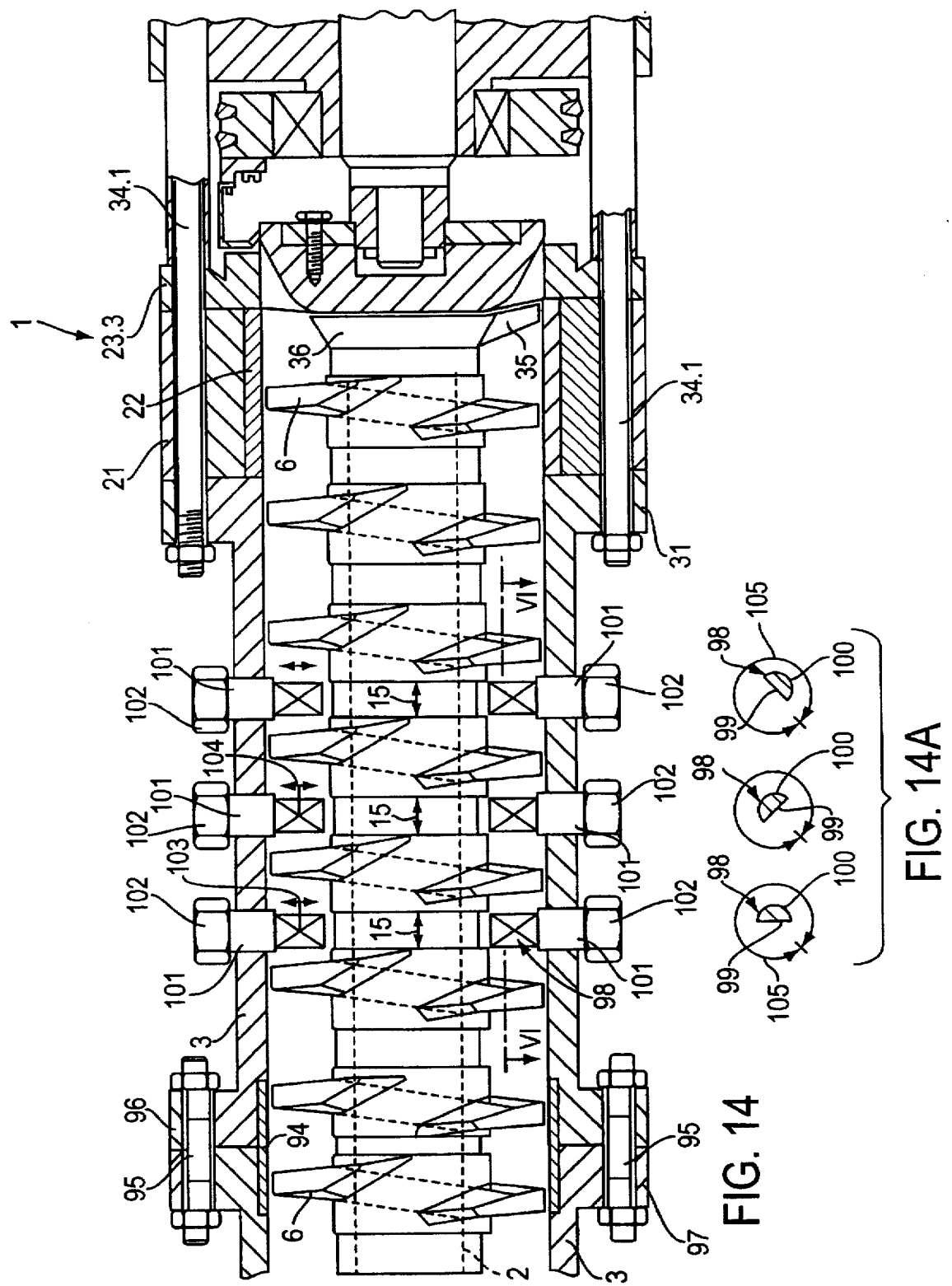
FIG. 14 is a longitudinal section of a variation of the screw extruder part of FIG. 13.

FIG. 14 shows a device analogous to that of FIG. 10, which is shown elongated however, so that additional housing flanges 96 and 97 and a second housing part of the housing 3 is shown on the left as seen in the Figure.

The housing flanges 96 and 94 are held together by a connecting bolt 95.

A support and bearing ring 94 analogous to the support and bearing ring 22 is provided in the flanges 96 and 97, wherein the illustration shows that support and bearing rings such as these may be provided at least in the region of the housing flanges so as to mount the extrusion screw with the same features mentioned previously.

In contrast to the fixed in FIG. 14a, kneading elements 82 of FIG. 13, kneading elements 98 which can be rotated in the directions of rotation indicated by the arrows 105 by means of a thread 101 in the housing 3 are fitted here. Rotary control knobs 102 are provided on these kneading elements in order to execute the rotary movement as shown by the arrows 105 indicating the directions of rotation.

The rotatable kneading elements 98 have a flat kneading face 99 on one side and a kneading face with convex curvature 100 on the other side. The kneading face 99 may also exhibit concave curvature, for example. This must be determined empirically.

The possibility of rotating the kneading elements 98 gives rise to the possibility of adjusting these in any positions as illustrated in FIG. 14a. The possibility also exists of displacing the kneading element 98 within a given range in the radial directions 103 and 104, respectively, corresponding to the thread 101.

The other elements correspond to the elements of FIG. 10 or of the previous Figures, and accordingly will not be described further and not characterised further.

Kneading elements 98 such as these give rise to the possibility of obtaining a wide degree of variability in the kneading effect in the screw, particularly since such kneading elements can be provided not only at the position in the screw extruder shown in FIG. 14 but can also be provided at other positions depending on the length of the screw extruder.

FIG. 15 likewise shows rotatable kneading elements which are also denoted by 98 here and which are of similar design to the kneading elements of FIG. 14, with the exception that the rotary control knob 102.1 additionally has an indicator arrow 116, which is directed towards an indicator scale 105.

The housing shown in this Figure is split in an analogous manner to that shown in FIG. 13, but is shown closed. The housing elements are accordingly denoted with a suffix. 1 with the exception of the upper housing flange 106, which is not illustrated in FIG. 13.

The rotary control knobs 102.1 and thus the kneading elements 98 are adjusted manually and have the same effect as that described for FIG. 14.

FIGS. 16 and 16a show the same housing and the same housing flanges as FIG. 15, except that the rotatable kneading elements 98 are provided with rotary control knobs 102.2 with each of which a toothed wheel rim 115 is associated, which engages in a rack 108.

The rack 108 is displaceably mounted in sliding guides 109 and 100 for displacement movements in the directions of displacement 107, and the displacement movement of the rack 108 is executed by means of a displacement cylinder 111. This displacement cylinder is controlled by a controller (not shown here) and is rigidly attached by means of a support element 114 to the upper housing half 83.1.

A piston rod 112 forming part of the displacement cylinder 111 is rigidly attached to a connecting element 113 which is disposed fixed on the rack 108.

FIG. 16a illustrates the screw shaft 2 and the base of the kneading elements 6. The hinges 84 known from FIG. 13 are also shown.

Figure 17:
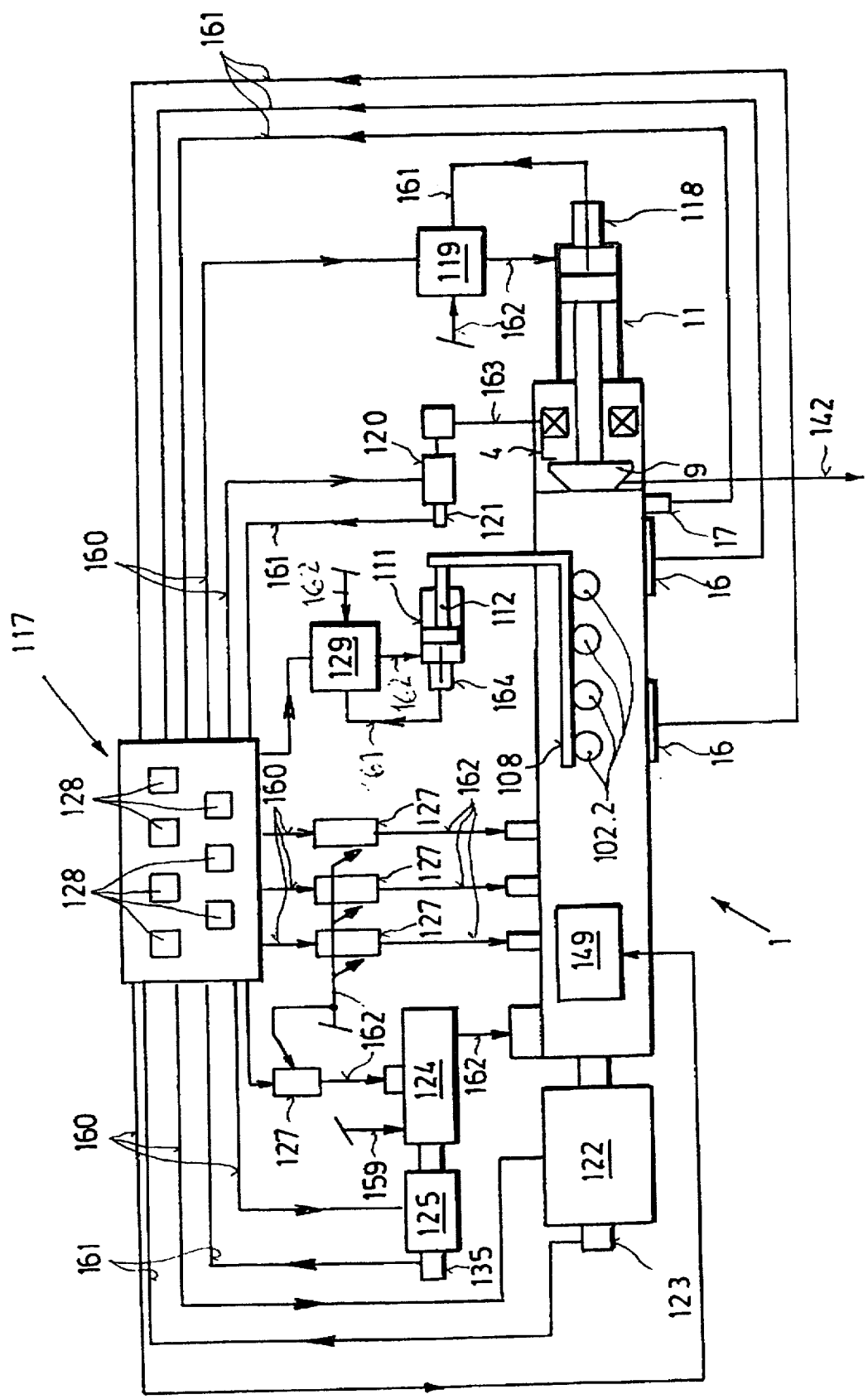
FIG. 17 is a schematic block diagram of an adjustment and control installation for operating the screw extruder of this invention.

FIG. 17 shows an adjustment and control installation 117 for operating the means described previously, in order to match the shape and the properties of a discharged final product to predetermined values. For example, the cross-section of the final product 142 can be altered by altering the position of the back-pressure element 9 and the length of the product can be altered by altering the peripheral speed of the cutter 4. Moreover, the kneading effect of the screw can be altered by altering its speed. A further possibility for altering the kneading effect in the screw is to adjust the kneading elements 98 by rotating the rotary control knobs 102, 102.1 and 102.2 shown in FIGS. 14, 15 and 16.

Furthermore, the consistency of the product in the screw can be varied and the kneading effect can be varied at a constant speed of the screw shaft by the predetermined feeding in of water and/or steam or optionally other liquids such as oil, liquid fat or molasses by means of the regulating device 127, and by the predetermined feeding in of an input product 159 (generally a mixture) via the metering unit 124 in relation to the feed of water and/or steam.

The installation therefore comprises the following elements controlled by the control system 117:

A piston travel measuring sensor 118 for measuring the travel of the back-pressure element 9;

a hydraulic installation 119 with corresponding control elements, in order to set and maintain the position of the back-pressure element 9 predetermined by the control system 117;

a variable speed drive 120 for the rotation of the cutter 4 to 4.4, having a speed monitoring device in order to indicate the speed of the drive 120 predetermined by the control system 117;

a variable speed drive 122 having a speed monitoring device 123 for the drive of the screw shaft 2, in order to indicate the speed of the drive 122 predetermined by the control system 117.

In addition, the control system 117 has a set value input (not shown) in order to predetermine and monitor the drive output of the drive 122 and to make a correction if a deviation occurs.

A further piston travel measuring sensor 164 and a hydraulic installation 129 having piston travel monitoring means and corresponding control elements is provided for operating the displacement cylinder 111 of FIG. 16 and 16a, in order to set and maintain the position of the piston 112 predetermined by the control system 117.

Regulating devices 127 regulate the rate of addition, which is predetermined by the control system 117, of steam and/or water or certain other liquids into the screw extruder 1 or into the metering unit 124.

This metering unit 124 meters the mount of product (kg/hour) introduced into the screw extruder 1. This unit 124 is driven by a variable speed drive 125 with a speed monitoring device 135, which is likewise connected to the control system 117. The speed monitoring device 135 here serves to maintain the speed of the drive 125 predetermined by the control system.

In addition, a symbolic number of indicator means 128 are provided in the control system for indicating the product temperature and the pressure in the product, the power consumption of the screw, the speed of the screw, the amount of product fed in (kg/hour) by means of the speed of the metering unit 124, the input amount of steam and/or water (kg/hour) and its corresponding temperature, and the position of the piston of the cylinder-and-piston unit for the back-pressure element 9, and also for the position of the piston 112 of the cylinder-and-piston unit for positioning the kneading elements, as well as an indication of the speed of the drive 120 for the cutter 4. The screw extruder also has means for heating or cooling the product material inside the screw extruder 1 from the outside. Such means may be controllable or adjustable heating or cooling elements (149) known in the art and mounted on the surface (for the sake of simplicity these means are merely indicated by a rectangle), which are likewise controlled or regulated by the adjustment and control installation 117, and which have an influence on the material to be processed in the screw extruder 1 as regards consistency, kneading effect, and extent of gelatinisation of the carbohydrates or coagulation of the protein in the product to be processed.

Adjustment means are also combined with the indicator means 128 in order to adjust the following parameters:

temperature of the heating or cooling medium 149;

set value for the power consumption of the drive motor 122 for driving the screw shaft 2 within a range of tolerance, speed of the screw shaft 2;

speed of the drive 125 of the metering unit 124 and thus the product feed rate (kg/hour); amount of steam and/or water or the mount of other specified liquids fed into the metering unit 124 and/or into the screw extruder 1;

position of the back-pressure element 9;

position of the kneading elements 98, either directly or via the position of the piston 112; and the peripheral speed of the cutter 4.

Figure 18:
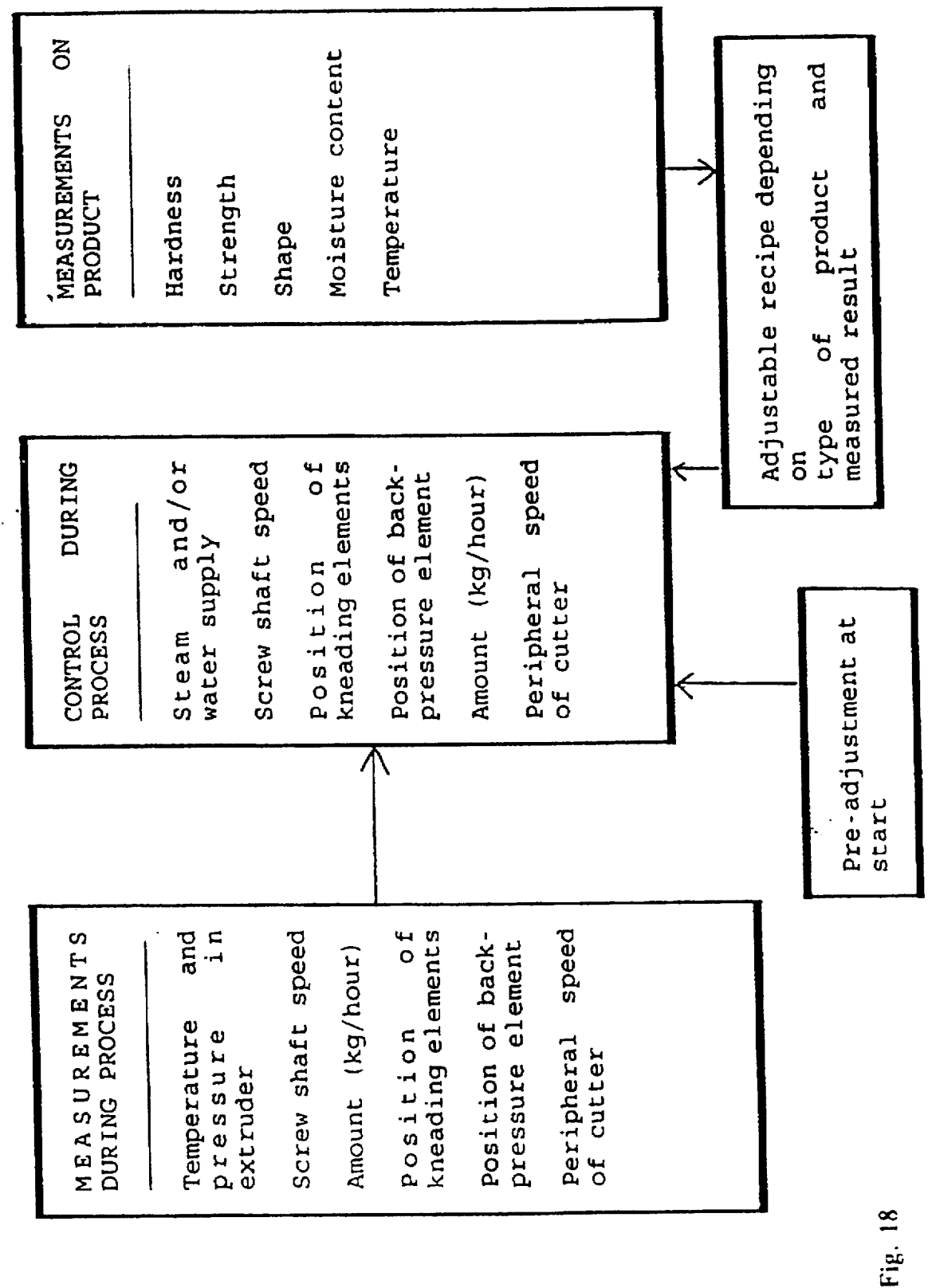
FIG. 18 is a block diagram indicating the process control parameters of this invention.

With regard to processing, the following process parameters are firstly measured during operation, as shown in FIG. 18:

temperature and pressure in the screw extruder;

speed of the screw shaft;

amount of product to be processed fed in, in kg/hour;

position of the kneading elements 98;

axial position of the back-pressure element 9 (in order to monitor the shape of the final product 142); and speed of the cutter drive 120 (in order thereby to monitor the peripheral speed of the cutter and the length of the final product).

Secondly, the hardness, strength, shape, moisture content and temperature of the product are measured in the laboratory and the screw extruder 1 is controlled in accordance with an empirically determined adjustable recipe which depends on the desired properties of the final product.

The control parameters controlled by the control system 117, which influence the aforementioned measured properties of the product, are the amount of steam and the steam temperature and/or the amount of water and the water temperature, the speed of the screw shaft, the type and/or position of the kneading elements, the position of the back-pressure element 9, the peripheral speed of the cutter 4, and the amount of product to be processed which is fed in, in kg/hour.

A predetermined adjustable recipe must be empirically determined for the start of the process, based on which recipe a product is primarily produced which is measured in the manner described .above and is correspondingly corrected during processing by altering the control parameters.

Figure 19:
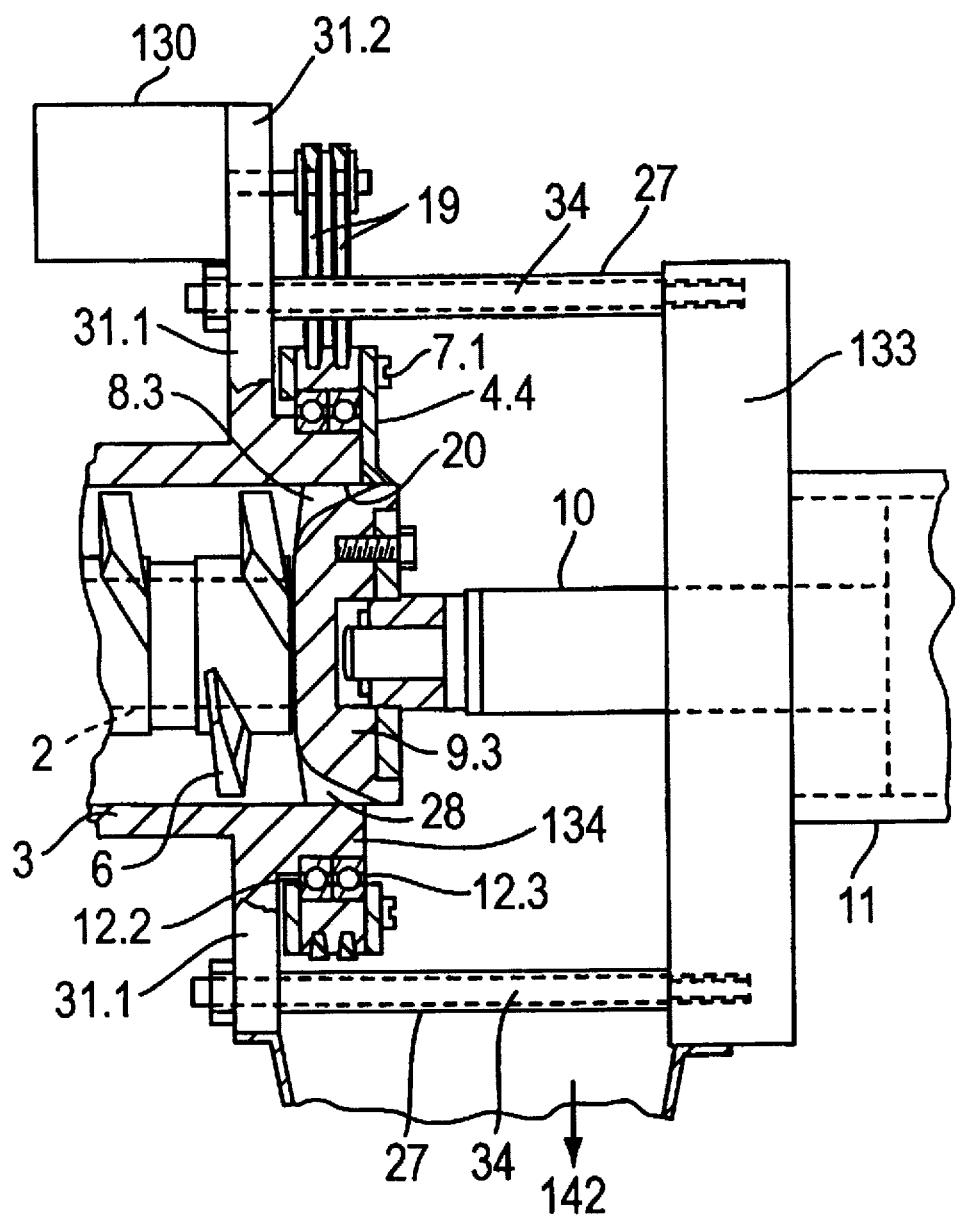
FIG. 19 is a partial sectional view of another variation of the head part of FIG. 9.

FIG. 19 shows a variant of the drive of a cutter which is attached to a support ring 7.1 and which is rotatably mounted by means of rolling bearings 12.2 and 12.3 on a cylindrical housing extension 134 of the housing 3, which is to the right of a housing flange 31.1 as shown in FIG. 19. The bearings 12.2 and 12.3 are rigidly attached to the housing extension 134. The cutter 4.4 cuts the material emerging from the passageway opening into the final product 142, which is termed a diced product.

The support ring 7.1 is driven by means of V-belts 19 which transmit the output of a variable speed motor 120, which is attached to a housing flange extension 31.2, to the support ring 7.1.

The cylinder-and-piston unit 11 is attached to a support flange 133 which is attached to the housing flange 31.1 by means of connecting stays 27 and bolts 54. In this respect the example of the support flange 133 forms an example for all the previous support flanges of the same category which have not been characterised further.

The remaining elements, which are denoted by known reference numerals, correspond to those described previously.

In this connection, FIG. 20 shows a variant of the head part of FIG. 19, wherein the hack-pressure element 9.4 is cup-shaped and wherein forming holes 143 are provided passing through the cup wall 147, which are distributed over the periphery and through which the product material conveyed by the kneading tools 6 is pressed and is cut by the rotating cutter 4.5 into a predetermined length to form pellets. As shown in FIG. 20, the forming holes 143 are advantageously disposed slanting at an angle α, but may also be disposed radially.

Due to the directions of movement F.1 and F.2 of the back-pressure element 9.4 on the one hand and due to the cup wall 147 of the back-pressure element 9 projecting into the cylindrical inner face 20.1 of the cylindrical housing extension 134.1 on the other hand, the possibility is created of keeping a greater or lesser number of forming holes 143 open. It is also possible to pull the back-pressure element 9 completely away from the cylindrical inner face, so that the product material can flow out freely; this is advantageous in order to prevent a blockage of the material in the screw in the event of a malfunction.

The back-pressure element is fastened in the piston rod by means of a thread 144 and is thus easily replaceable.

The cup-shaped back-pressure element 9.4 is closely guided by the cylindrical inner face 20.1 in such a way that no product material can escape outwards along this face.

In this connection, FIG. 21 shows a variant of FIG. 20, wherein the forming holes 143.1 are in the cylindrical housing extension 134.2, and the back-pressure element 9.5 is of piston-like form and is closely guided on the cylindrical inner face 20.2 of the housing extension 134.2 in such a way that no product material can escape outwards along this inner face 20.2. The forming holes 143.1 are also advantageously disposed here slanting at an angle α, but may also be disposed radially.

Due to the directions of movement F.1 and F.2 of the back-pressure element 9.5, a greater or lesser number of forming holes 143.1 may be open.

The forming holes 143.1 may be arranged in rows as viewed axially. However it is also possible to provide any other arrangement; this also applies to the forming holes 143 of FIG. 20.

Cylindrical housing extension 134.2 can, as shown via broken lines, be divided into two parts, by means of an internal thread 145 and a thread extension 146.

The remaining elements of FIGS. 20 and 21, which are denoted by known reference numerals, correspond to those described previously.

The following control variants, which are implemented by the adjustment and control installation 117, exist for the application of the devices described previously:

1. What is termed "pressure measurement control" for the use of the screw extruder with the head parts shown in FIGS. 1 to 12 and 19 to 21 operates as follows:

The pressure cylinder 11 of the back-pressure element 9 is subjected in each case to a hydraulic pressure which is empirically determined in relation to the desired final product, so that a corresponding operating pressure is produced in the screw extruder, which results in a corresponding cross-section of the final product. This first-mentioned pressure is monitored by the control system and is kept within a range of tolerance.

This pressure adjustment is effected whilst maintaining the following predetermined operating parameters:

Input product mixture and feed rate (kg/hour), amount of steam and/or water at a predetermined temperature in a predetermined ratio to the aforementioned amount of product, adjustment of the kneading elements (if available), speed of the screw shaft, peripheral speed of the cutter, attainment of a product material temperature measured by means of a temperature sensor 16 and attainment of a predetermined motor output for the drive of the screw shaft.

If the pressure in the screw extruder alters for any reason in such a way that the position of the back-pressure element is outside a predetermined pressure tolerance range, the pressure in the pressure cylinder 11 is automatically reduced by means of the control system to such an extent that the back-pressure element can move back far enough, whilst an alarm is emitted, so that a free outlet is ensured for the product, which prevents either a blockage of the screw or the production of a final product which is unusable.

2. What is termed "travel measurement control", for the use of the same screw extruder with the same head parts which were employed for the aforementioned type of control, operates subject to the same predetermined operating parameters but in addition the pressure in the screw extruder is also measured here by means of the pressure sensor 17, so that on reaching a predetermined temperature in the screw extruder, which is measured by means of the temperature sensor 16, the pressure cylinder 11 of the back-pressure element 9 is subjected to a hydraulic pressure which is empirically determined in relation to the desired final product, so that a corresponding operating pressure and a predetermined position (also termed travel) of the piston of the cylinder 11, and thus of the back-pressure element 9, is attained, in the screw extruder. This travel is measured with the aid of the travel measuring device 118 (also termed the positional measuring device).

Outside this travel tolerance range it is ensured that the product can flow out freely, as mentioned previously.

A predetermined cross-section of the final product is thereby obtained. This cross-section (corresponding to the position of the back-pressure element 9) is maintained within a predetermined tolerance range by the control system with the aid of the piston travel measuring sensor 118.

3. A third possible control system consists of the piston of the cylinder 11 and thereby the position of the back-pressure element 9 being locked during operation by any means, for example by an adjustable clamping element (not shown), so as to permit the final product to have absolute constancy of cross-section. A prerequisite such as this for the cross-section necessitates a control system in which the parameters to be varied, such as the amount of input product 159, the amount of water and/or steam fed into the metering unit 124 and/or directly into the screw extruder 1, the additional heat generated by the heating element 149, the position of the kneading elements 98, the speed of the screw shaft 2, the temperature and/or pressure in the screw, for example, are indicated in the control system and the desired product is produced with regulation or control by manual adjustments by the "trial and error" principle or is regulated or controlled automatically based on an empirically determined and statistically evaluated recipe, wherein in the latter case it must also be possible to input possible corrections into the recipe so as to be able to effect adaptations when there are deviations from a corresponding set value for the product.

The following statements should be made in this respect, in addition to those already made with reference to FIG. 17:

1. As mentioned previously, the number of indicator means 128 in FIG. 17 is merely symbolic. It is to be understood that indicator means are provided for all the aforementioned parameters employed for controlling the installation.

2. For all the aforementioned parameters which are necessary for the control of the installation the control system comprises control elements, which are not illustrated, the commands from which control elements are sent to the elements to be controlled by means of control lines, for example for controlling the rotational speed of the metering unit 124 or of the screw or of the screw shaft 2 or of the cutter 4, or for controlling the pressure of the hydraulic control systems 119 and 129 for the position of the back-pressure element 9 and the position of the piston rod 112, respectively, and also for controlling the amount of water and/or steam at a predetermined temperature by means of the regulating devices 127. Signal lines are also provided in each case, in order to transmit the speed of the drives for the screw shaft 2 and the metering unit 124 or of the cutter 4, for example, and in order to transmit the travel signals from the piston travel measuring device 118 and the piston travel measurement control systems 119 and 129 and the temperature signals from the temperature sensors 16 or the pressure signal from the pressure sensor 12 to the adjustment and control installation 117.

Finally, feed lines 162 are provided in order to introduce water and/or steam into the metering unit 124 and into the screw 1 and in order to supply or discharge a hydraulic pressure medium via the hydraulic control systems 129 and 119 into or from the displacement cylinders 111 and 11, respectively (the discharge system is not illustrated). A transmission 163 is also provided in order to transmit the torque of the cutter drive to the cutter 4.

FIG. 22 shows an extension to the third-mentioned possible control system, wherein the product, which is produced with automatic control or regulation based on an empirically determined and statistically evaluated recipe, is additionally monitored on-line.

This on-line monitoring firstly consists of quality control 141 with respect to moisture content, fat content, degree of gelatinisation, protein content, and—if necessary—with respect to the composition of the raw material, as the control measure for the input material 159 fed into the metering unit.

A quality control system such as this is produced by the Applicant and is commercially available under the trade name NIRVIS. In this process it comprises the rapid determination of bulk materials by means of spectral analysis, which is effected in the near infrared (NIR) wavelength region between 800 nm and 2500 nm.

A batch (occasionally also termed a "portion") can be tested about once a minute so that the result can be input into the control system 117.1 and so that the aforementioned corrections to the recipe can be made if necessary. This quality control system comprises as NIRVIS controller 165, which is illustrated as a symbolic Figure here for the sake of simplicity. The unit receives signals via signal lines 161 from a NIRVIS measuring head which is immersed in the product and which checks the product for a predetermined period of time.

A temperature probe 168 which is also inserted in the product transmits the temperature of the product to the control unit 165, so that the result can be evaluated depending on the temperature. The product to be measured is diverted from the final product stream 142 by means of a pipe distributor guide 179, which is operated by a drive controlled by the control system 117.1, and is led into a collecting vessel 177 via a feed line 162.

When it is full, the collecting vessel 177 is closed by a slide gate valve 172 and a level sensor 167 signals the filling of the vessel 177 via a signal line 161, firstly to the control system 117.1 which ensures that the pipe distribution guide 179 is switched to "pass" again, and the level signal is secondly fed to the NIRVIS controller 165 so that the measurement can be performed when the collecting vessel is full.

After the NIRVIS controller 165 has transmitted the result to the control system 117.1, this control system issues a command via a control line 160 to a control valve 169, so that compressed air from a source of compressed air 170 can be fed via a feed line 162 into a cylinder 171 in order to pull back the slide gate valve 172 and to convey the product into a collecting hopper 173 and to guide a first part of the product on to a metering conveyor belt 174, which is in continuous operation due to a drive 175 and which feeds the product from the collecting hopper via a product conveyor 176 to the flowing final product 142 again. The drive 175 is controlled via a control line 160 by the control system 117.1.

A further quality control means 152 serves to check the abrasion resistance of the product and consists of an apparatus described in European Patent 0 460 406 B1 and shown in FIG. 8 thereof. This patent specification is accordingly to be regarded as an integral part of the present Application, at least in terms of that which relates to its principle and essential elements; certain additions thereto or departures therefrom are described later. Despite this, the operation of these apparatuses will be briefly explained again with reference to the Figure shown in the present Application.

As stated in relation to the aforementioned quality control system using the NIRVIS procedure, the product is also inspected batchwise here. For this purpose the pipe distribution guide 183 is switched over for a predetermined period of time (input into the control system) due to a command received from the control system 117.1 via the control line 160 and transmitted to the drive 184, so that product is fed via a feed line 162 into a collecting hopper 187. At this time a change-over flap 186 is positioned so that the product flows downwards as shown in the Figure though the feed pipe 191 until rests on a screen 188 provided over the entire cross-section of a conveying pipe 189. The position of the flap 186 has been brought about by a control unit 185 which receives the changeover command via a control line 160 at the same time as the pipe distribution guide 183.

By means of a further control line 160 the control unit 185 switches on a transporting air fan 193, which lifts the product off the screen 188 and causes it to circulate as indicated (see the arrows in pipes 189 and 191 and in the hopper 187) via the collecting hopper 187 for a period of time which is preprogrammed in the control unit 185, so that the product impinges on baffles which are contained in the pipe 189, but which are not shown here, so that abrasion can occur during this circulation. This circulating flow is effected by a first speed stage of the fan 193, which permits the velocity of the air in the pipe 189 to be high enough to transport the entire product. In this connection the supply air to the fan is denoted by 194 and the exhaust air from the collecting hopper 187 is denoted by 190, i.e. the circulation relates only to the product and not to the air.

After a predetermined period of time, the control unit 185 switches the fan to a second speed stage, which reduces the rotational speed or the air velocity in the feed pipe 189 to such an extent that the coarse fraction is no longer entrained but remains behind, and only the fine fraction (abraded material) is transported into the hopper 187. At the same time the flap 186 is positioned so that this fine fraction reaching the collecting hopper 187 is conveyed through a diverter pipe 192 on to a belt weigher 195 so that it can be weighed on this belt weigher and so that the result can be conveyed via a signal line 161 to the control system 117.1.

The belt weigher conveys the product into a mixing hopper 206 and thus conveys it back to the flow of final product 142.

It should also be mentioned that a rotary lock 207 is provided in the feed pipe 191 to prevent the transporting air from reaching the collecting hopper 187 through the feed pipe 191 instead of entering the pipe 189. The lock 207 is also controlled by the control unit 185, which is not shown here for the sake of simplicity however, and rotates as long as the flap 186 is set for circulation of the product.

In this connection, FIG. 22a shows a variant compared with FIG. 22, wherein a collecting vessel 177.1 is provided with perforated plates though which cooling air 181 can enter the product flow in the collecting vessel 177.1. The cooling air itself is extracted by a cooling air fan with a drive motor 182 and is discharged into the atmosphere again. The fan motor 182 is switched on and off by the NIRVIS control unit 165 by means of a control line 160. A product feed pipe 178 conveys the product from the feed line 162 through the cooling air duct in such a way that it can be collected in the collecting vessel 177.1 without damage.

The remaining elements with the same functions are denoted by the same reference numerals and will not be described again here.

Figure 23:
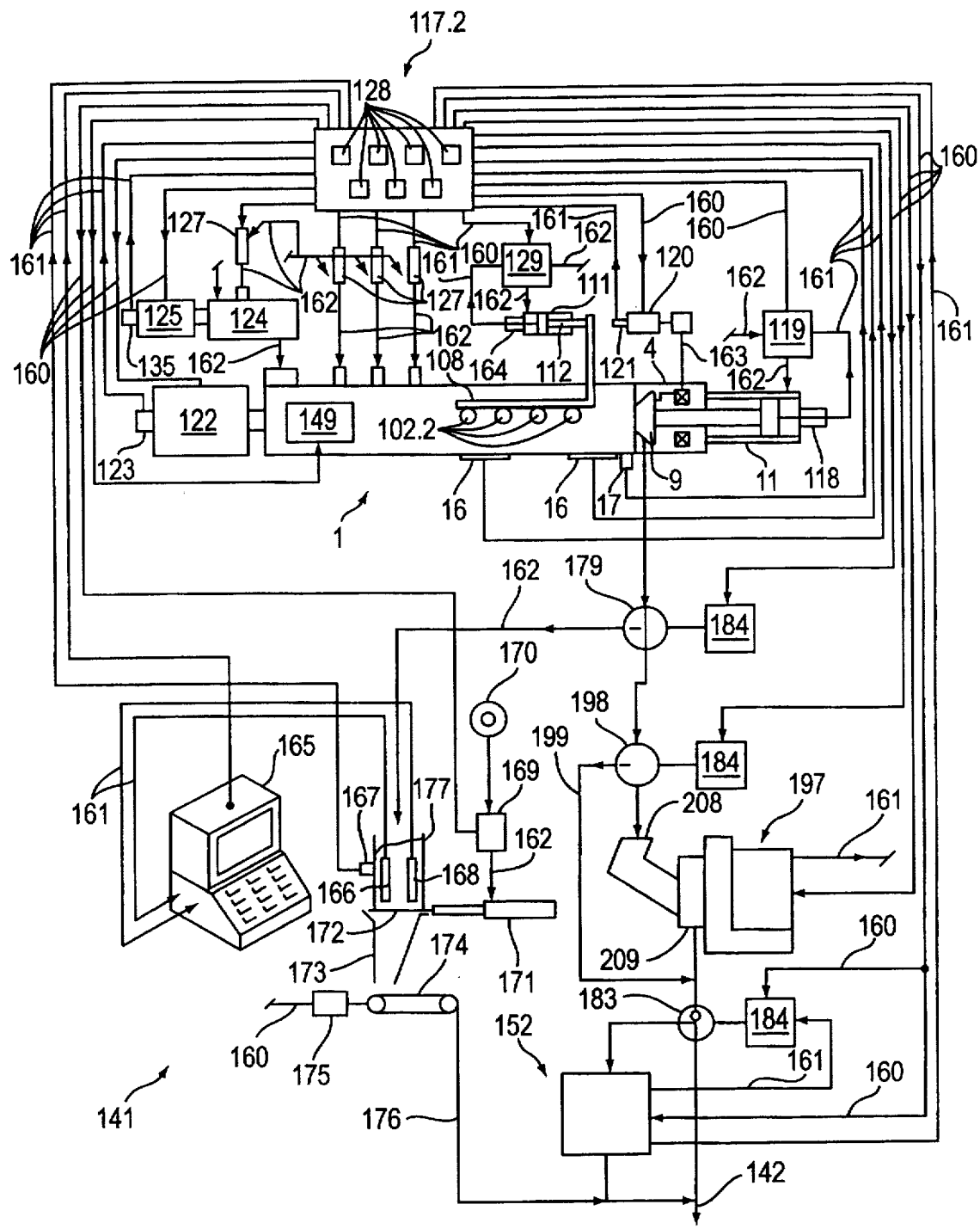
FIG. 23 is another variation of the schematic diagram of FIG. 17.

In this respect, the installation of FIG. 23 constitutes a variant compared with the installation of FIG. 22, wherein pellet press 197 is provided between quality control stages 141 and 152. After the pipe distribution guide 179 and after passing through the pipe distribution guide 198, the product enters an inlet 208 of the pellet press 197 and after being processed is discharged again by the dicing press at an outlet 209.

A pellet press or pellet mill such as this is known in the art and is sold by the Applicant world-wide under the trade name "KUBEX"; a detailed described is therefore omitted for the sake of simplicity. In this connection, it is to be understood that the output of this pellet press 197 is matched to the output of the screw extruder 1.

The pellet press 197 can be by-passed by means of the pipe distribution guide 198, in that a control command is given by an adjustment and control installation 117.9 via a control line 160 to the drive 184 of the pipe distribution guide 198, so that the product can be conveyed into the product stream again after the pellet press 197 via the by-pass 199.

The product which leaves the screw extruder 1 in the region of the back-pressure element 9 is represented by corresponding arrows, the final product after the pellet press 197 being denoted by 142 in this case. This applies not only to the present FIG. 23 but also FIGS. 24 and 25 which are described below.

In order to test the product discharged from the screw extruder 1, the pipe distribution guide 179 is switched over as described previously in connection with FIG. 22, and the tested product is again merged with the final product 142, as described previously for FIG. 22.

The operations for the quality control stage 141 are the same as those described for FIG. 22, wherein the variant shown in FIG. 22A may also be selected here.

After the pellet press the product is tested by quality control stage 152 at predetermined time intervals, the operations here also being the same as those described for FIG. 22.

The batches for quality control stage 141 and also for quality control stage 152 can be selected, the level sensor 167 determining the quantity for quality control stage 141, and a time function element of the adjustment and control installation 117.2 determining the change-over cycle for the pipe distributor guide 183, as mentioned previously.

Figure 24:
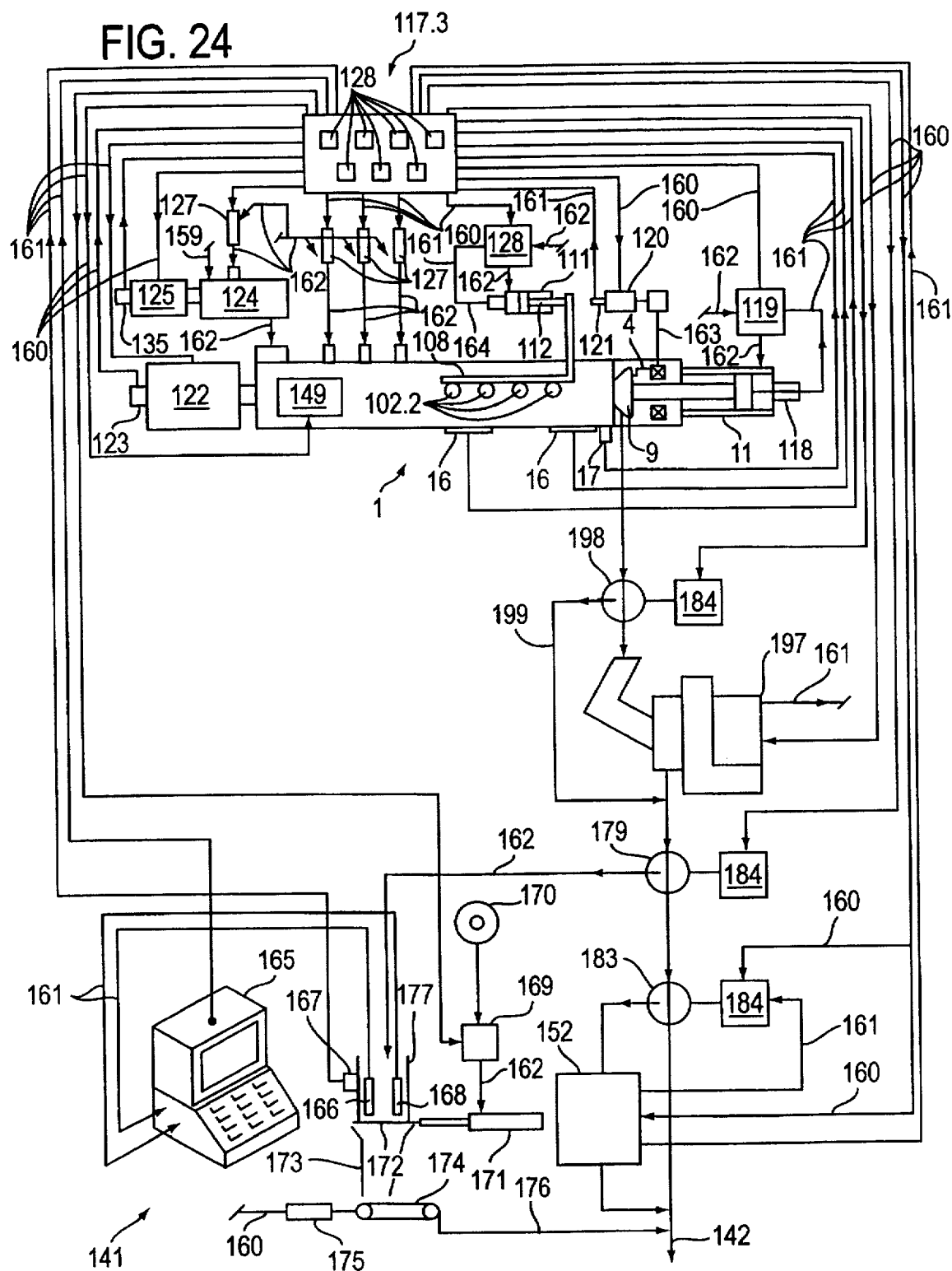
FIG. 24 is further variation of the schematic diagram of FIG. 17.

In this respect the installation of FIG. 24 constitutes a variant compared with the installation of FIG. 23, wherein the dicing press 197 together with the by-pass 199 is provided before quality control stages 141 and 152.

The actual change-over operations for the pellet press 197 and for the quality control stages 141 and 152 correspond to those described for FIG. 23, and the description of these operations will therefore not be repeated for this reason.

Figure 25:
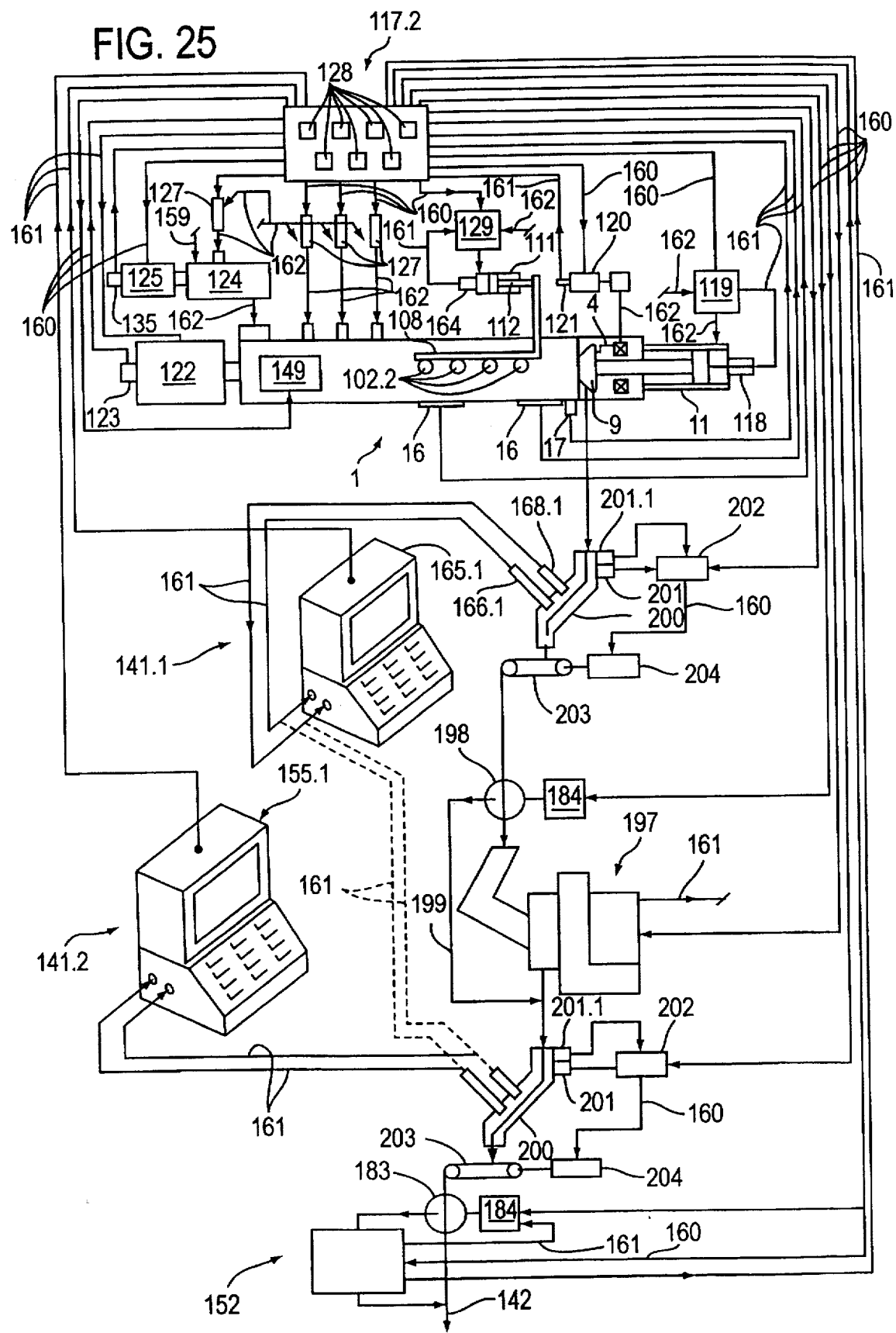
FIG. 25 is still a further variation of the schematic diagram of FIG. 17.

The quality control system employed in FIG. 25 for checking the moisture content, fat content, degree of gelatinisation, protein content and optionally the composition of the raw materials of the product is not a so-called NIRVIS unit as described previously for FIGS. 22 to 24, but is a unit which is also sold world-wide by the Applicant under the trade name NIRDAS.

The difference between the two is that the product is measured directly on-line in the main product stream by means of the NIRDAS quality control system 141.1 and/or 141.2.

The product discharged from the screw extruder 1 accordingly enters a flow vessel 200 in which it is banked up as far as a level sensor 201 provided on this flow vessel 200, whereupon a control unit 202 connected to the level sensor 201 switches on a drive 204 at a first speed, via a control line 160, for a metering conveyor belt provided after the flow vessel 200. This first speed of the metering conveyor belt 203 is selected so that the product in the flow vessel 200 rises even further, as far as the level sensor 201, whereupon the control unit 202 causes the metering conveyor belt 203 to be driven at a second speed, due to the signal from the level sensor 201. This second speed allows the product level in the flow vessel 200 to fall again as far as the level sensor 201, whereupon the control unit 202 switches the speed of the metering conveyor belt 203 to the first, slower speed. In this manner it is possible to maintain a degree of filling in the flow vessel 200 which is necessary for a correct measurement with a measuring head 166.1 of a NIRDAS 165.1 controller.

In addition, a temperature probe 168.1 is likewise provided, and both the measuring head 166.1 and the temperature probe 168.1 send their signals via signal lines 161 to the NIRDAS controller 165.1.

The NIRDAS controller 165.1 transmits the result which is determined via a signal line 161 to the adjustment and control system 117.4, which, if there are deviations from a predetermined set value for at least one product parameter comprising the moisture content, fat content, degree of gelatinisation, protein content and optionally the composition of the raw material, either emits an alarm signal or makes predetermined corrections to the recipe for the corresponding situation. In this respect a range of tolerance is specified for the set value, within which the aforementioned correction is to be made.

The metering conveyor belt 203 transfers the product to a pellet press. 197 as described previously, which can be by-passed by means of the pipe distributor guide 198 and the by-pass 199 as described previously for FIG. 24.

In this variant a second quality control stage of the type denoted by 141.1 is provided after the dicing press 197. This stage is denoted at this point by 141.2, however.

The entire measuring procedure and all the elements which are necessary for it corresponds to that carried out for quality control stage 141.1, and will therefore not be described again.

However, as indicated by the signal lines 161 shown as the broken lines, it is possible to perform the quality measurement alternatively before or after pellet press using a single NIRDAS unit, so that the two results can be compared alternately with the set value entered in the control system 117.4, and on the dicing press the distance between the rolls known in the art and the ring mould known in the art can be varied as a process parameter. Moreover it is possible, as is also possible for the installation described with reference to FIGS. 23 and 24, for the power consumption of the dicing press drive to be input into the adjustment and control installation 117.4 via a signal line 161, so that it can be used in combination with the said distance as a process parameter.

The possibility and nature of the adjustment of the aforementioned distance between the rolls and the ring mould are illustrated and described in the European Patent Applications with the publication numbers 231 764 and 371 519, and form an integral part of the present Application; no further description will therefore be given.

That which relates to the signalling of the motor output as a process parameter by means of the signal line 161 also of course applies to the installations described with reference to FIGS. 23 and 24.

In this Figure, instead of the aforementioned alternate measurement by means of one apparatus 165.1 only, the product discharged from the pellet press 197 is measured by means of quality control stage 141.2, as is also possible for the installation of FIG. 24, wherein all the elements previously mentioned for carrying out the quality check 141.1 are the same, and will therefore not be described again.

The product which is discharged from the metering conveyor belt 203 of the second measurement is inspected with the aid of quality control stage 152 in the manner described previously for FIGS. 23 and 24, and the corresponding results are input into the control system 117.4 in the same manner.

The control systems 117.1 to 117.4 preferably include a computer in order to make the said corrections to the corresponding recipe, so as thereby to obtain an optimised final product 142 based on all the measured results and the correspondingly adjusted parameters.

In principle, the possibility of on-line measurement exists for at least one of the following properties:

moisture content degree of gelatinisation fat content protein content, either after the screw extruder or after the dicing press or after the screw extruder and after the dicing press.

The same also applies to the on-line measurement of the abrasion resistance, namely that this may be provided either before the screw extruder or after the dicing press or after the screw extruder and after the pellet press. In addition, the possibility exists of providing on-line measurement of one of the following properties:

moisture content degree of gelatinisation fat content protein content before or after the on-line measurement of the abrasion resistance.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A process for controlling the quality of feedstuff that is to be kneaded and pressed into a shape, the process comprising:

measuring at least one of a plurality of predetermined properties of the feedstuff;

varying predetermined adjustment parameters of at least one device producing the feedstuff, depending upon deviations from a predetermined desired value range, until the plurality of predetermined properties lie within the predetermined desired value range, the plurality of predetermined properties comprising:

humidity of the feedstuff;

degree of gelatinization of starch;

protein content;

fats content; and abrasion resistance of the feedstuff; and the varying of the predetermined adjustment parameters comprising at least one of:

manually varying the adjustment parameters and indicating the adjustment parameters according to a principle of trial and error; and automatically varying the adjustment parameters based upon an empirically determined and statistically evaluated recipe.

2. The process according to claim 1, the at least one device comprising a screw extruder; and the adjustment parameters further comprising at least one of:

quantity of incoming feedstuff;

rotational speed of a screw shaft;

at least one of water and steam at a predetermined temperature entering at least one of the screw extruder and an input device for the incoming feedstuff;

kneading elements that are adjustable from outside of the device;

a quantity of heat that heats the product in the screw extruder independently of friction of the product;

cross-section of the product; and length of the feedstuff.

3. The process according to claim 2, the at least one device further comprising a pelleting press having rollers and die; and an additional adjustment parameter comprising a distance between the rollers and die.

4. A screw extruder for controlling the quality of feedstuff that is kneaded and pressed into a shape, the screw extruder comprising:

a kneading and extruder screw rotatably positioned and driven within a housing;

an extruder head coupled to the kneading and extruder screw that presses the feedstuff into a predetermined shape;

a counter pressure member;

an annular body, coupled to the housing, that at least partly axially surrounds the counter pressure member;

at least one of the counter pressure and the annular body comprising die channels of a predetermined shape that shape a cross-section of the product;

a device that varies a longitudinal shape of the feedstuff;

intermediate bodies engaging into the die channels to shape the cross-section of the product and resiliently arranged on the annular body to vary the cross-section of the product, a device for moving the resiliently arranged intermediate bodies in a radially inward direction, the resiliently arranged intermediate bodies biased in a radially outward direction.

5. The screw extruder according to claim 4, further comprising:

ramps located on the intermediate bodies;

a ring, movable over the ramps in an axial direction of the kneading and extruder screw, shaped such that axial movement of the ring imparts radial inward movement on the intermediate bodies.

6. The screw extruder according to claim 5, the ring being displaceable by a motor.

7. The screw extruder according to claim 4, further comprising:

a partial vacuum device positioned at an outlet of the die channels to place the die channels in a partial vacuum.

8. The screw extruder according to claim 4, further comprising a cutter located at a discharge end of the die channels and driven independently of a rotation speed of the screw.

9. The screw extruder according to claim 4, further comprising:

a screw winding comprising a plurality of interruptions;

interchangeably arranged kneading elements located at the housing that engage the interruptions;

the interchangeably arranged kneading elements being at least one of fixed and adjustably arranged and comprising an asymmetrical cross-section;

an opening in the housing to facilitate changing of the interchangeably arranged kneading elements;

a device for rotatably driving the interchangeably arranged kneading elements;

at least one support ring that provides bearing action for a screw shaft, the at least one support ring located at least at an end of the screw shaft directed toward the extrusion die.

10. An installation for performing a process for controlling the quality of feedstuff that is kneaded and pressed into a shape using a screw extruder and pelleting press, the installation comprising:

an adjustment and control device for controlling predetermined functions of the screw extruder, the predetermined functions comprising:

rotation speed of the screw shaft;

rotation speed of a metering unit that controls the quantity of incoming product into the screw extruder;

quantity of at least one of water and steam into at least one of a metering unit and the screw extruder at a predetermined temperature;

pressure in a displacement cylinder for adjustment of kneading elements;

temperature of a heating device that controls the temperature of the product in the screw extruder;

pressure in a piston-cylinder unit that displaces a counter pressure member to maintain a predetermined pressure;

travel of a piston of the piston-cylinder unit that maintains a position of the counter pressure member; and a peripheral speed of a cutter that produces a predetermined length of an end product;

the installation further comprising:

an on-line measurement device that measures the abrasion resistance, the on-line measurement device located at one of after the screw extruder, after the pelleting press, and after the screw extruder and the pelleting press;

the on-line measurement device further measures at least one of humidity, degree of gelatinization, proportion of fats, and proportion of protein at a position located at one of before and after the abrasion resistance measurement.

* * * * *